(12) United States Patent
Borovoy et al.

(10) Patent No.: US 9,374,396 B2
(45) Date of Patent: Jun. 21, 2016

(54) RECOMMENDED CONTENT FOR AN ENDORSEMENT USER INTERFACE

(71) Applicant: Google Inc., Mountain View, CA (US)

(72) Inventors: Richard Daniel Borovoy, Boston, MA (US); Lucy Elsbeth Hadden, Newton, MA (US); Geoffrey Allen Borggaard, Lincoln, MA (US); Julie Heather Farago, Somerville, MA (US); Evan Gilbert, Oakland, CA (US); Jeremy Faller, Arlington, MA (US); Mark Fickett, Cambridge, MA (US)

(73) Assignee: Google Inc., Mountain View, CA (US)

( * ) Notice: Subject to any disclaimer, the term of this patent is extended or adjusted under 35 U.S.C. 154(b) by 607 days.

(21) Appl. No.: 13/730,252

(22) Filed: Dec. 28, 2012

(65) Prior Publication Data

US 2013/0346877 A1    Dec. 26, 2013

Related U.S. Application Data

(60) Provisional application No. 61/663,604, filed on Jun. 24, 2012.

(51) Int. Cl.
  *G06Q 30/02* (2012.01)
  *H04L 29/06* (2006.01)
  *G06Q 10/10* (2012.01)
  *G06Q 50/00* (2012.01)

(52) U.S. Cl.
  CPC .............. *H04L 65/403* (2013.01); *G06Q 10/10* (2013.01); *G06Q 30/02* (2013.01); *G06Q 50/01* (2013.01); *H04L 65/4084* (2013.01)

(58) Field of Classification Search
  None
  See application file for complete search history.

(56) References Cited

U.S. PATENT DOCUMENTS

| | | | |
|---|---|---|---|
| 8,095,432 B1 | 1/2012 | Berman et al. | |
| 8,112,720 B2 | 2/2012 | Curtis | |
| 2006/0059225 A1* | 3/2006 | Stonehocker et al. | 709/202 |
| 2006/0080305 A1* | 4/2006 | Dill et al. | 707/3 |
| 2009/0132520 A1 | 5/2009 | Nemeth et al. | |
| 2009/0171686 A1* | 7/2009 | Eberstadt | 705/1 |
| 2010/0287033 A1* | 11/2010 | Mathur | 705/10 |
| 2011/0137950 A1 | 6/2011 | Deng et al. | |
| 2012/0101806 A1 | 4/2012 | Davis et al. | |
| 2012/0191776 A1* | 7/2012 | Ruffner et al. | 709/204 |

OTHER PUBLICATIONS

International Search Report and Written Opinion for PCT Application PCT/US13/47265, dated Nov. 22, 2013, 11 pages.
European Search Report for PCT/US2013047265, mailed on Dec. 22, 2015, 5 pages.

* cited by examiner

*Primary Examiner* — Yongjia Pan
*Assistant Examiner* — Daniel Samwel
(74) *Attorney, Agent, or Firm* — Patent Law Works LLP

(57) ABSTRACT

In one aspect, a system for providing a user interface including recommended content in response to an endorsement input is described. The system includes a processor and a memory storing instructions that, when executed, causes the system to: receive an input from a first user; determine that the input is related to an endorsement of a first content item from a first source; determine a social correlation between the first content item and a second content item from a second source, determine a source correlation between the first source and the second source, determine recommended content using the social correlation and the source correlation and provide the recommended content to the first user.

20 Claims, 36 Drawing Sheets

RECOMMENDED CONTENT FOR AN ENDORSEMENT USER INTERFACE

CROSS REFERENCE TO RELATED APPLICATIONS

This application claims priority under 35 USC §119(e) to U.S. Application No. 61/663,604, entitled "Recommended Content for an Endorsement User Interface" filed Jun. 24, 2012, the entirety of which is herein incorporated by reference.

BACKGROUND

The present disclosure relates to user interfaces for providing recommended content.

The popularity and use of the Internet, web browsers, social networks and other types of electronic communication have grown in recent years. While users may have once operated their computing devices with a single browser showing a single webpage, new ways for delivering and engaging with information, e.g., videos, news articles, Web blogs and activities on social networks have been developed. More recently, much of the content on the World Wide Web can be commented upon or endorsed by users. Users can indicate they like or endorse something by selecting an endorsement button associated with the particular Web content or object to be endorsed. Users may also post comments about content, share content or blog about content that they had viewed on the Internet. It is common for many users to have multiple windows open at a given time while viewing different content, and it may be cumbersome and inefficient to require the user to transition between different interfaces or windows to undertake action, for example, endorsing particular content.

SUMMARY

According to one innovative aspect of the subject matter described in this disclosure, a system for providing a user interface including recommended content or information in response to an endorsement input is described. The system includes a processor and a memory storing instructions that, when executed, cause the system to: receive an input from a first user; determine that the input is related to an endorsement of a first content item from a first source; determine a social correlation between the first content item from the first source and a second content item from a second source, the social correlation indicating both the first content item and the second content item are associated with a first engagement action performed by a second user connected to the first user in a social graph; determine a source correlation between the first source and the second source, the source correlation indicating both the first source and the second source are associated with one or more second engagement actions performed by the first user; determine recommended content using the social correlation and the source correlation; and generate graphical data for depicting a user interface element that provides the recommended content to the first user.

In general, another innovative aspect of the subject matter described in this disclosure may be embodied in methods that include: receiving an input from a first user; determining that the input is related to an endorsement of a first content item from a first source; determining a social correlation between the first content item from the first source and a second content item from a second source, the social correlation indicating both the first content item and the second content item are associated with a first engagement action performed by a second user connected to the first user in a social graph; determining a source correlation between the first source and the second source, the source correlation indicating both the first source and the second source are associated with one or more second engagement actions performed by the first user; determining recommended content using the social correlation and the source correlation; and generating graphical data for depicting a user interface element that provides the recommended content to the first user.

Other implementations of one or more of these aspects include corresponding systems, apparatus, and computer programs, configured to perform the actions of the methods, encoded on computer storage devices.

These and other implementations may each optionally include one or more of the following features. For instance, the features include: the first source and the second source being associated with a domain specified by a publisher and the recommended content including the second content item; the input being one of a request for an endorsement button to endorse the first content item, a cursor over the endorsement button, a selection of the endorsement button, and a sharing of the first content item; the user context describing one or more of a search history being associated with the first user, social data being associated with the first user, transaction data being associated with the first user, advertisement data being associated with the first user, whether the first user has made endorsements to other content items, whether a number of endorsements made by the first user is lower than a predetermined threshold, whether the first user has shared the first content item and whether the first user has commented on the first content item; the recommended content being ordered by one of a number of social annotations and recency of the recommended content; and the user interface element being one of an endorsement button, an annotation and a share box. For instance, the operations further include: determining a user context describing the first user, and wherein the recommended content being further determined based on the user context.

The present disclosure may be advantageous because it can be able to identify recommended content and provide the recommended content to the user in association with endorsement activities. This can be particularly advantageous because the recommended content can be provided in a context in which it may be very useful to the user. More specifically, the present disclosure provides recommended content in a share box and the share box can include action buttons for interacting with the recommended content for example, commenting on it, sharing it, making a purchase related to it, taking other actions related to the content or transitioning to other interfaces to view the content. The present disclosure may be also advantageous because the context of the user can be used to generate the recommended content. Context information may include information from a social network, information about searches, endorsement information, web history, publisher information, and domain information which may or may not be particular to the user.

BRIEF DESCRIPTION OF THE DRAWINGS

The disclosure is illustrated by way of example, and not by way of limitation, in the figures of the accompanying drawings in which like reference numerals are used to refer to similar elements.

DETAILED DESCRIPTION

Figure 1:
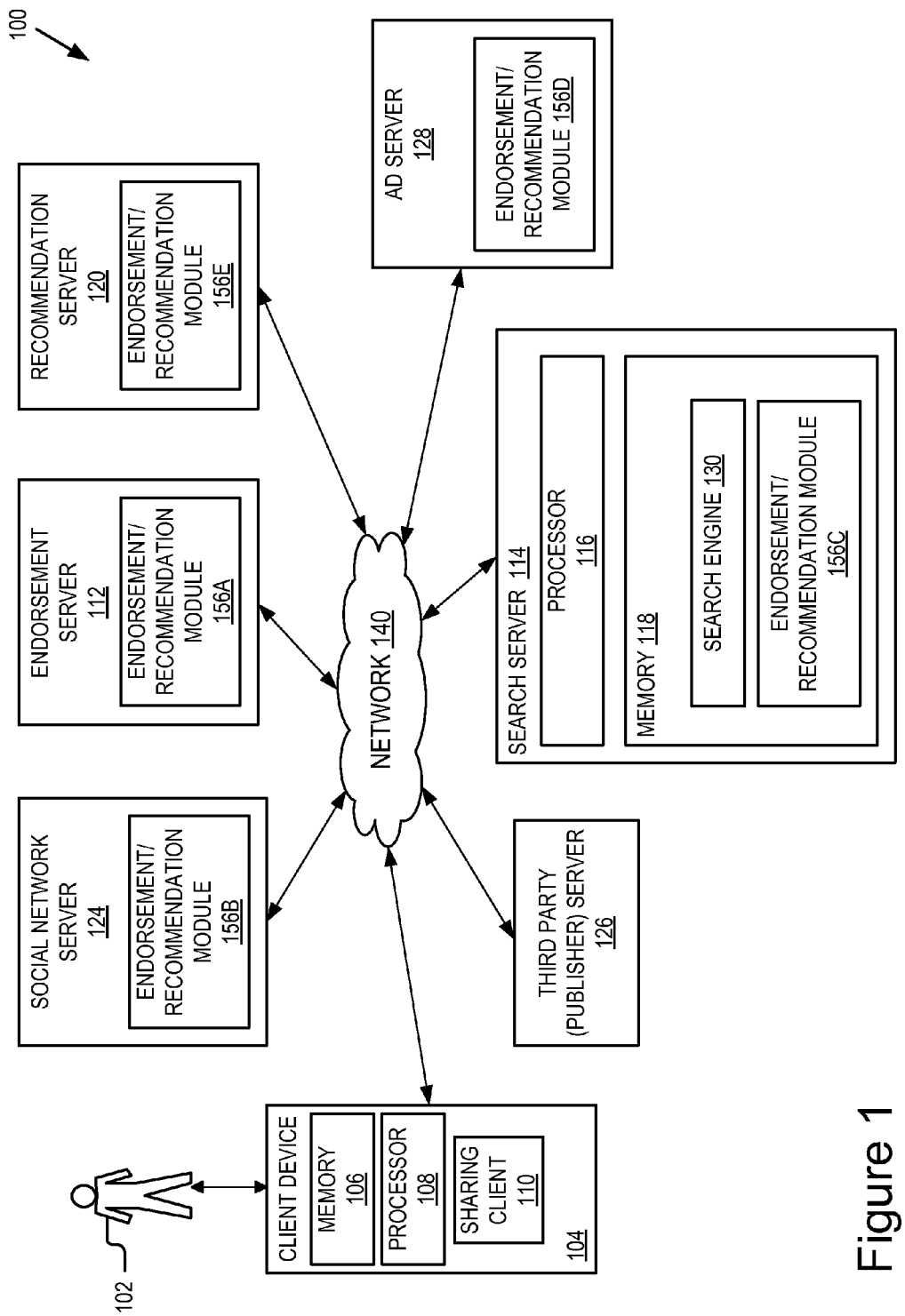
FIG. 1 is a block diagram illustrating a first example implementation of a system for providing recommended content in a share box.

FIG. 1 illustrates an implementation of a system 100 for presenting a user interface (e.g., a share box) with content information in response to an endorsement input. The system 100 includes a client device 104, a network 140, an endorsement server 112, a search server 114, a recommendation server 120, a social network server 124, a third party server 126 and an advertising (ad) server 128. The client device 104 can be utilized by a user 102 to input a request to retrieve information from: (1) the third party server 126, (2) the search server 114 or (3) to receive a stream of data from the social network server 124. The client device 104 is coupled for communication with the network 140 which in turn is coupled for communication with the endorsement server 112, the search server 114, the recommendation server 120, the social network server 124, and the third party server 126.

Although only a single user 102 and client device 104 are illustrated, any number of client devices 104 can be available to any number of users 102. Furthermore, while only one network 140 is coupled to the client device 104, the endorsement server 112, the search server 114, the social network server 124 and the third party server 126, in practice any number of networks 140 can be connected to the system 100. Additionally, while only one endorsement server 112, search server 114, recommendation server 120, social network server 124, and third party server 126 is respectively shown, the system 100 could include one or more endorsement servers 112, search servers 114, recommendation servers 120, social network servers 124, and third party servers 126. Moreover, while the present disclosure is described below primarily in the context of content from third party servers 126, search results and streams from a social network server 124, the present disclosure can be applicable to any type of online communications with multiple data sources and multiple data types.

The client device 104 includes a memory 106, a processor 108 and a sharing client 110. The client device 104, for example, may be a personal computer, a laptop computer, a tablet computer, a mobile phone (e.g., a smart phone) or any other computing device.

The memory 106 stores instructions and/or data that may be executed by the processor 108. The memory 106 is coupled to a bus for communication with the other components. The instructions and/or data may include code for performing the techniques described herein. The memory 106 may be a dynamic random access memory (DRAM) device, a static random access memory (SRAM) device, a flash memory or some other memory device.

The processor 108 includes an arithmetic logic unit, a microprocessor, a general purpose controller or some other processor array to perform computations and provide electronic display signals to a display device. The processor 108 is coupled to a bus for communication with the other components. Processor 108 processes data signals and may include various computing architectures including a complex instruction set computer (CISC) architecture, a reduced instruction set computer (RISC) architecture, or an architecture implementing a combination of instruction sets. Although only a single processor is shown in FIG. 1, multiple processors may be included. Other processors, operating systems, sensors, displays and physical configurations are possible.

The sharing client 110 may be software or routines operable on the client device 104 for performing at least part of the operations required for creating and displaying a user interface or share box. The sharing client 110 also receives and processes input from the user 102. The sharing client 110 also processes and sends the contents of the share box in response to user selection of actions or buttons associated with content in the share box. For example, the sharing client 110 may be a plug-in to a web browser 202 (see FIG. 2). In one implementation, the sharing client 110 accepts inputs from the user 102, sends the inputs to the endorsement/recommendation module 156, displays a share box, and sends inputs related to the share box to the endorsement/recommendation module 156, but the endorsement/recommendation module 156 can be primarily responsible for processing and generating the share box. Such an implementation can be well suited for applications where the client device 104 can be a smart phone with limited computational power. In some implementations, the sharing client 110 performs at least part of the processing steps that will be described below as being performed by the endorsement/recommendation module 156. For example, in addition to receiving input from the user 102 and generating displays for presentation to the user 102, the sharing client 110 may create the share box, populate the share box with content, filter the content in the share box, personalize the content in the share box, and in response to user input share or distribute the content of the share box to other systems. In some implementations, individual steps of the methods described below may be divided between the sharing client 110 and the endorsement/recommendation module 156 in a variety of different ways.

The client device 104 can be configured for communication with the network 140. In response to user input, the client device 104 generates and sends a request to the network 140. The network 140 receives and passes the request on to the endorsement server 112, the search server 114, or the social network server 124 depending on the type of request. A response can be generated by the endorsement server 112, the search server 114, or the social network server 124 depending on the type of request. The response may be a web page, search results, a stream from a social network or other content. This content can be displayed on the client device 104 to the user 102. The content will also include one more endorsement buttons, generated by the endorsement server 112. The user can endorse the content or portions of it by selecting an endorsement button.

The network 140 can be wired or wireless, and may have one or more configurations, e.g., a star configuration, token ring configuration or other configurations. Furthermore, the network 140 may include a local area network (LAN), a wide area network (WAN) (e.g., the Internet), and/or other interconnected data path across which multiple devices may communicate. In some implementations, the network 140 may be a peer-to-peer network. The network 140 may also be coupled to or include portions of a telecommunications network for sending data in a variety of different communication protocols. In some implementations, the network 140 includes Bluetooth communication networks or a cellular communications network for sending and receiving data via short messaging service (SMS), multimedia messaging service (MMS), hypertext transfer protocol (HTTP), direct data connection, wireless application protocol (WAP), email, etc.

The search server 114 includes a processor 116 and a memory 118. The processor 116 is similar to the processor 108 described above; however, it may have increased computing capability. The memory 118 is similar to the memory 106 described above; however, it may be larger in size, have faster access time, and also include volatile and nonvolatile memory types.

In some implementations, the memory 118 stores a search engine 130 and an endorsement/recommendation module 156C. The search engine 130 can be operable on the processor 116 to receive the query signal and in response return search results. The search engine 130 collects, parses, indexes and stores data to facilitate information retrieval. The search engine 130 also processes search queries and returns search results from the data sources that match the terms in the search query. The search engine 130 also ranks search results based upon relevance to the user. The search engine 130 also formats and sends the search results via the network 140 to the client device 104. In some implementations, the search engine 130 is coupled for communication with the endorsement/recommendation module 156C to modify the ranking of the search results based on input signals from the endorsement/recommendation module 156C.

The endorsement/recommendation module 156 may be software or routines that can be responsive to user input and generate the user interface or share box as will be described below with reference to FIGS. 6A-13F. Although FIG. 1 shows multiple endorsement sharing modules 156A, 156B, 156C, 156D and 156E, a single endorsement/recommendation module 156 can be included according to the present disclosure. That endorsement/recommendation module 156 may be part of the endorsement server 112, the search server 114, the recommendation server 120, the social network server 124 or the ad server 128. The endorsement/recommendation module 156, regardless of which server 112, 114, 120, 124 and 128 it can be part of, cooperates with the sharing client 110 of the client device 104. In some implementations, multiple endorsement sharing modules 156A, 156B, 156C, 156D and 156E cooperate with each other to provide the functionality as described below with reference to FIGS. 4-13F.

In some implementations, the endorsement/recommendation module 156C can be operable as part of the search server 114 and is coupled to receive the context of information presented to the user 102 by the search engine 130. The endorsement/recommendation module 156C is also coupled to communicate with the endorsement server 112 to receive information related to the endorsement of a particular piece of content. In some implementations, the endorsement/recommendation module 156C is also coupled for communication with the social network server 124 to receive the context of information presented to the user 102 by the social network server 124. The endorsement/recommendation module 156C is coupled to receive other types of information, for example information about a user's social graph, information about user interaction with the social network server 124, user interaction with a video sharing site, or other system with which a user may interact including but not limited to micro-blogs, comments, votes (e.g., indicating approval or disapproval of particular content), other indications of interest (e.g., that promote content for consumption by other users), playlists (e.g., for video or music content) and the like. The endorsement/recommendation module 156C is also coupled to communicate with the recommendation server 120. The endorsement/recommendation module 156C receives recommended content and other information about the user from the recommendation server 120. In some implementations, users can be provided options to opt-in or opt-out of having this type of information being used. Similarly, publishers can be provided with options to opt-in or opt-out of having their content included as part of recommended content. The present disclosure will be described below in the context of endorsement of search results; however, the principles and concepts of the disclosed technologies can be applied to other type of content including web content or resources, social network information, or micro blogs, posts, etc.

In some implementations, the endorsement/recommendation module 156C receives social information from the social network server 124, endorsement information from the endorsement server 112, recommended content from the recommendation server 120, or video or multimedia information from a multimedia server (not shown) and uses that information to modify the ranking of search results. For example, the ranking of the search results may be modified based on whether one or more of the user's contacts, as determined from the social network, have reviewed the results. In another example, the ranking of the search results may be modified based on whether another user has endorsed a search result or more particularly whether one or more contacts of the user have endorsed a search result. Still further, the ranking of the search results may be modified using information from video or multimedia information from a multimedia server.

In some implementations, the social network server 124 is coupled to the network 140. The social network server 124 also includes a social network software/application (not shown). Although one social network server 124 is shown in detail, multiple social network servers 124 may be present. A social network can be a type of social structure where the users may be connected by a common feature. The common feature includes relationships/connections, e.g., friendship, family, work, an interest, etc. The common features can be provided by one or more social networking systems, for example, those included in the system 100, including explicitly-defined relationships and relationships implied by social connections with other online users, where the relationships form a social graph. In some examples, the social graph can reflect a mapping of these users and how they may be related. Furthermore, the social network server 124 and social network software/application can be representative of one social network and that there can be multiple social networks coupled to the network 140, each having its own server, application and social graph. For example, a first social network can be more directed to business networking, a second can be more directed to or centered on academics, a third can be more directed to local business, a fourth can be directed to dating and others of general interest or a specific focus. Furthermore, the social network server 124 may provide personalized streams of content including photos, posts, shares, and other information from a variety of sources including friends, colleagues, news sources, etc.

As shown in FIG. 1, in one implementation, the endorsement/recommendation module 156B operates as part of the social network server 124. This implementation of the endorsement/recommendation module 156B has the same functionality as has been described above for the endorsement/recommendation module 156C that can be part of the search server 114. The endorsement/recommendation module 156B generates and populates a user interface or share box in response to user requests. The endorsement/recommendation module 156B obtains the context of the user from the social network server 124. The endorsement/recommendation module 156B also communicates with the endorsement server 112, the search server 114 and the recommendation server 120 to retrieve other contextual information. This information can be used by the endorsement/recommendation module 156B to filter and personalize the content. The content may be then used to populate a user interface (e.g., share box), for example, using java script. The user interface of the present disclosure can be rendered on the client side or the server side regardless of the server in which the endorsement/recommendation module 156 can be operating.

An endorsement server 112 includes a processor (not shown) and a memory (not shown). The processor is similar to the processor described above; however, it may have increased computing capability. The endorsement server 112 also includes software or routines operable on the server to implement the endorsement system. In some implementations, the endorsement server 112 can be a system for tracking content and indicating users who have endorsed or recommended existing content. In some implementations, the endorsement system implemented by the endorsement server 112 can be applicable to information available on the World Wide Web. In some implementations, the endorsement system can be applicable to content created by users of the social network. In some implementations, the endorsement system can be applicable to content like videos available over the Internet. The endorsement server 112 can be coupled to receive endorsements from the user, coupled to receive search results, and coupled to provide endorsement information to the endorsement/recommendation modules 156B, 156C, 156D and 156E. In some implementations, the endorsement server 112 includes the endorsement/recommendation module 156A. The endorsement/recommendation module 156A has the same or similar functionality to the endorsement sharing modules 156B, 156C described above with reference to the social network server 124 and the search server 114, respectively.

In some implementations, the advertising (ad) server 128 is coupled to the network 140. The ad server 128 includes software and routines for serving ads in response to queries for search results from the search server 114 or on web sites from the third party server 126. The ad server 128 stores advertisements used in online marketing and delivers them to website visitors for example as sponsored links or display ads. Depending on the implementation, the ad server 128 works in concert with the search server 114 or functions independently. Although one ad server 128 is shown in detail, multiple ad servers 128 may be present. In some implementations, the ad server 128 also includes an endorsement/recommendation module 156D. The endorsement/recommendation module 156D works as part of the ad server 128 to return ads to client device 104 as part of the content populated to the share box, and targeted ads can be selected (1) based on the context used to determine the additional content to return to the user, or (2) based on the additional content itself to be returned to the user. In some implementations, the endorsement/recommendation module 156D cooperates with the ad server 128 to return ads to other locations on the page where the endorsement may be taking place, but outside of the share box itself. In some implementations, the endorsement/recommendation module 156D works with the ad server 128 to return ads with the shared content once the endorsing user has completed his or her own addition to the share box and sends the ad and shared content for sharing to other locations (social network, blog, etc.). In this case, the ad may appear as content alongside the shared content or on other portions of the landing page for the shared content.

The third party server 126 is coupled to the network 140 to provide content for example web pages. In some implementations, the third party server 126 can be the Web server of a publisher. The third party server 126 includes a processor (not shown) and a memory (not shown) and serves web pages in response to a HTTP requests. Although a single third party server 126 is shown, there may be hundreds or even thousands of third-party servers 126 providing different content.

As shown in FIG. 1, in one implementation, the endorsement/recommendation module 156E operates as part of the recommendation server 120. The recommendation server 120 may be responsible for providing recommended content. The recommendation server 120 may be coupled to receive information and content from the social network server 124, endorsement server 112, the search server 114, the third party server 126 and the ad server 128. This implementation of the endorsement/recommendation module 156E has the same functionality as has been described above for the endorsement/recommendation module 156C that can be part of the search server 114. The endorsement/recommendation module 156E generates and populates a user interface or share box in response to user requests. The endorsement/recommendation module 156E obtains the context of the user as well as other contextual information from the social network server 124, the endorsement server 112, the search server 114, the third party server 126 and the ad server 128. This information can be used by the endorsement/recommendation module 156E to generate, filter and personalize the recommended content.

Figure 2:
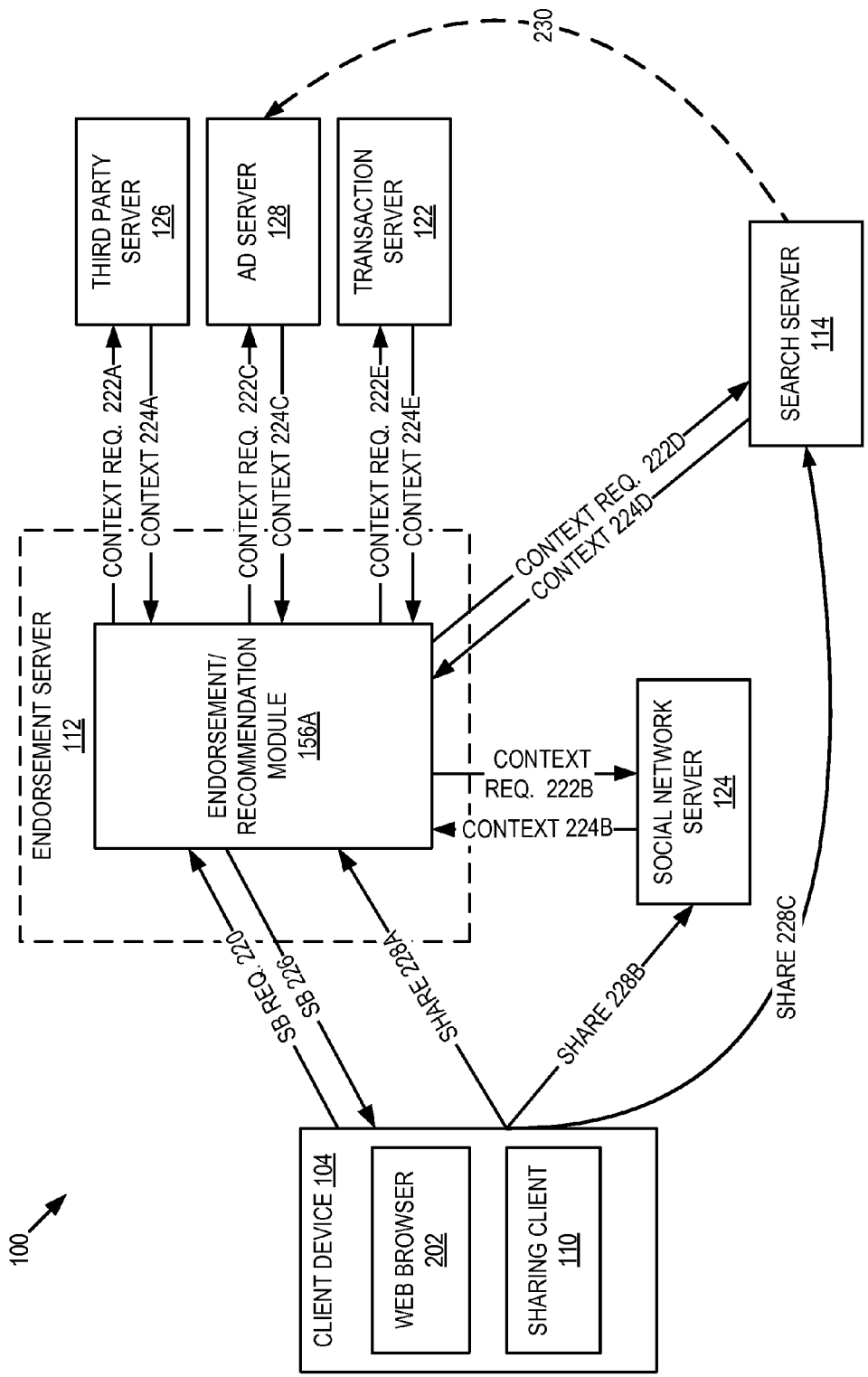
FIG. 2 is a block diagram illustrating a second example implementation of the system for providing recommended content in a share box.

FIG. 2 shows another implementation with the relationship between the client device 104, the endorsement server 112, the search server 114, a transaction server 122, the social network server 124, the third party server 126 and the ad server 128. Although not shown in FIG. 2, the recommendation server 120 may be similarly be configured for communication with the endorsement/recommendation module 156A to receive and respond to context requests 222 with context 224 information. In some implementations, the endorsement/recommendation module 156 could be part of the social network server 124, the search server 114, the ad server 128 or the recommendations server 120 rather than part of the endorsement server 112. In such implementations, the endorsement/recommendation module 156 would cooperate with components of the server which it can be a part of in a similar manner to that shown in FIG. 2.

FIG. 2 illustrates the signals that can be passed between the client device 104, endorsement server 112 (in particular, the endorsement/recommendation module 156A), the search server 114, the transaction server 122, the social network server 124, the third party server 126 and the ad server 128 to create a user interface including recommended content responsive to interaction with endorsements. The endorsement/recommendation module 156A also interacts with these other systems to share content, perform transactions or perform other functions related to the other servers 112, 114, 120, 122, 124, 126, 128. It should be understood that the endorsement/recommendation module 156A can be representative of the endorsement/recommendation module 156 and that a system with a single endorsement/recommendation module 156B in the social network server 124, a single endorsement/recommendation module 156C in the search server 114, a single endorsement/recommendation module 156D in the ad server 128 or a single endorsement/recommendation module 156E in the recommendation server 120 would operate in a similar manner.

The user 102 and the client device 104 cooperate so that content can be displayed by the client device 104. For example, a webpage can be retrieved from the third party server 126, a stream can be retrieved from the social network server 124 or search results can be retrieved from the search server 114. The user 102 inputs a signal requesting an endorsement button, endorsement related information or a share box. The client device 104 sends a share box or endorsement request signal 220 to the endorsement/recommendation module 156A. The endorsement/recommendation module 156A processes the share box or endorsement request signal 220 and creates a user interface (e.g., an endorsement button, annotation or share box). The endorsement/recommendation module 156A determines the identity of the user and the context in which the request for the endorsement related information was made so that this context can be used to determine what recommended content to automatically insert into the share box.

In some implementations, the endorsement/recommendation module 156A sends a context request signal 222A to the third party server 126. The third party server 126 responds by providing the context 224A. In this case, providing the context 224A can be performed by sending information about the webpage (or even the actual web page) that was provided to the client device 104.

In some implementations, the endorsement/recommendation module 156A sends a context request signal 222B to the social network server 124. The social network server 124 responds by sending the context 224B. In this case, the context 224B includes social data associated with the user describing the content being viewed by the user 102 (e.g., a stream of content, a post, a blog, a photo, sharing, etc.), actions performed by the user in the social network, actions performed by friends of the user in the social network, a social graph associated with the user, content viewed by other users that may be connected to the user in the social graph, etc.

In some implementations, the endorsement/recommendation module 156A sends a context request signal 222C to the ad server 128. The ad server 128 responds by sending the context 224C. In this case, the context 224C includes ads or links appropriate for the context. The ad server 128 may also receive other context information from the social network server 124, the third party server 126, the endorsement/recommendation module 156A or search server 114 to better define the context and thereby better target the ads sent to match the context for maximum effectiveness. The ad server 128 may receive this information directly from the social network server 124, the third party server 126, the endorsement/recommendation module 156A or the search server 114 as shown by a representative signal line 230 shown with dashes since this information also may be provided via the endorsement/recommendation module 156A.

In some implementations, the endorsement/recommendation module 156A sends a context request signal 222D to the search server 114. The search server 114 responds by sending the context 224D. In this case, the context 224D describes a search history associated with the user including the content being viewed by the user 102, e.g., web pages, data tags, search history, popular searches, etc.

In some implementations, the endorsement/recommendation module 156A sends a context request signal 222E to the transaction server 122. The transaction server 122 responds by sending the context 224E. In this case, the context 224E includes transaction data associated with the user for purchasing content or products identified in the recommended content. For example, the context 224E could be information on how to purchase goods, download music, download or stream video, etc. In some implementations, the context 224E includes transaction data describing one or more transactions performed by the user.

Although not shown in FIG. 2, in some implementations, the endorsement/recommendation module 156A sends a context request signal 222 to the recommendation server 120. The recommendation server 120 responds by sending recommended content 224. In this case, the recommended content may be web pages, video, audio, or other content based on popularity, relevance to the user, recency, number of social annotations, correlations to what other users annotated, etc. Some of the functionality provided by the recommendations server 120 can be incorporated into the endorsement/recommendation module 156A as will be described in more detail below with reference to the implementation of FIG. 3.

The endorsement/recommendation module 156A receives the context 224A, 224B, 224C, 224D, 224E from the third party server 126, the social network server 124, the ad server 128, the search server 114, or the transaction server 122 and uses that context to determine what information to include within the user interface or share box. This process will be described in more detail below with reference to FIGS. 3-5 and can include filtering information based on publisher information from the third party server 126, filtering information based on user preference information from the social network server 124 or the search server 114, or other types of personalization of the content for the user. The endorsement/recommendation module 156A then creates a user interface or share box including the recommended content and the actions that can be taken on the recommended content and sends the user interface or share box 226 to the client device 104. The endorsement/recommendation module 156A may also deliver ad content as part of the share box 226 or along with the share box 226 as has been described above. The share box 226 (and/or recommended content) can be received by the sharing client 110 and presented to the user 102 on the web browser 202. The user 102 may add content to the share box. Included within some implementations of the share box can be a number of actions or buttons that can be selectable by the user 102. The user 102 may choose to share the content in the share box to one or more of other server systems or take one or more other actions on the content in the share box.

Three examples of potential actions are shown in FIG. 2. First, the content in the share box may be shared/sent back 228A to the endorsement/recommendation module 156A. Second, the content in the share box may be shared/sent back 228B to the social network server 124 for sharing with friends or groups of friends of the user 102. Third, the content in the share box may be shared/sent back 228C to the search server 114 for use in improving the operation of the search engine 130. Although not shown, the content in the share box may also be shared with other systems including but not limited to micro blogging sites, bulletin boards, video hosting sites, blogs, forums, etc. The actions in the share box may also be to consummate transactions and provide information to the transaction server 122.

While FIG. 2 describes one implementation in which most of the operations of the present disclosure can be performed by the endorsement/recommendation module 156A, in some implementations, at least part of the steps described above may be performed by the sharing client 110. In such a case, the sharing client 110 processes the share box request 220, generates the share box, communicates with the other servers 114, 120, 122, 124, 126, 128 to request and receive context, determines the content for the share box based upon the context and provides the share box with injected content for presentation by the web browser 202. The sharing client 110 also receives input from the user regarding actions to take on the content and performs those actions for example, sharing 228A, 228B, 228C with other systems.

Figure 3:
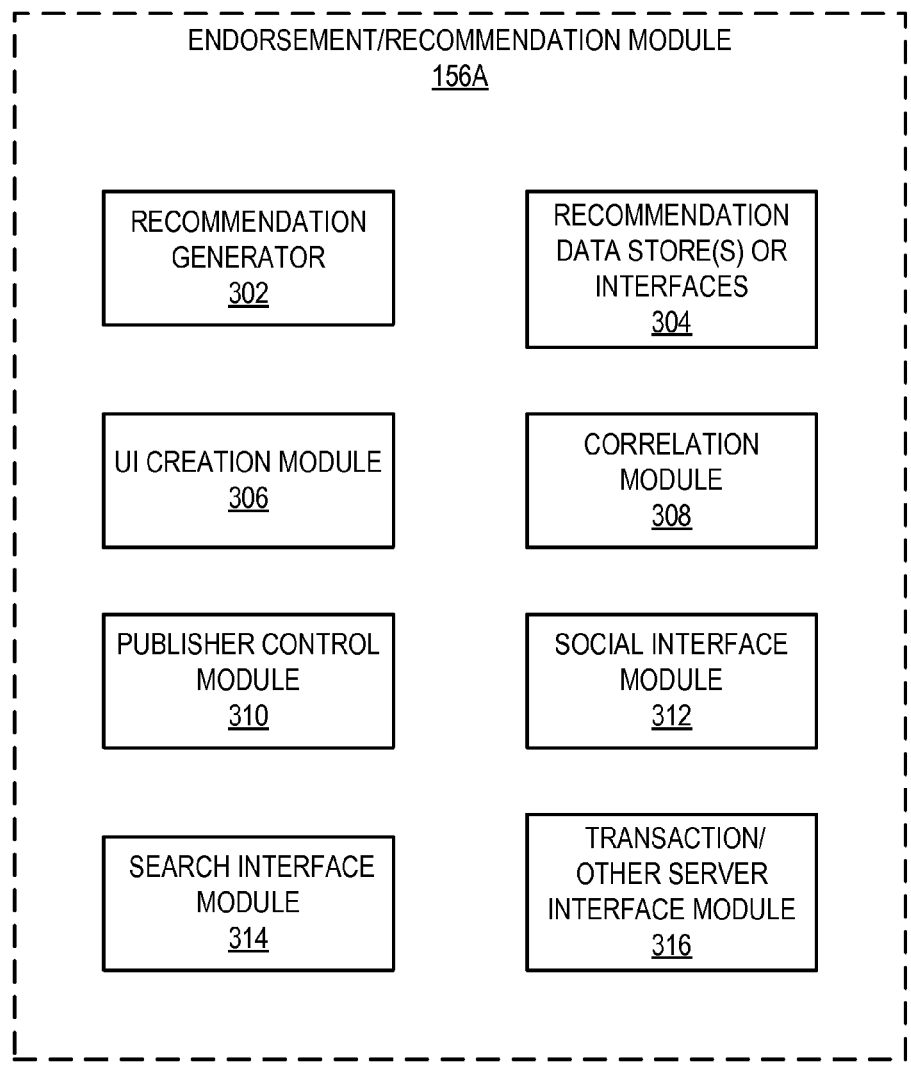
FIG. 3 is a block diagram illustrating an example implementation of an endorsement/recommendation module.

Referring now to FIG. 3, an implementation of the endorsement/recommendation module 156A is shown. In this implementation, the endorsement/recommendation module 156A includes a recommendation generator 302, one or more recommendation data store(s) or interface(s) 304, a user interface (UI) creation module 306, a correlation module 308, a publisher control module 310, a social interface module 312, a search interface module 314 and a transaction/other server interface module 316.

The recommendation generator 302 may be software or routines for generating recommended content. The recommendation generator 302 is coupled or configured for communication with the one or more recommendation data store(s) or interface(s) 304, the UI creation module 306, the correlation module 308, the publisher control module 310, the social interface module 312, the search interface module 314 and the transaction/other server interface module 316. The recommendation generator 302 cooperates with the one or more recommendation data store(s) or interface(s) 304 to retrieve content that can be processed and potentially sent as recommended content. The recommendation generator 302 may receive additional content from the social interface module 312, the search interface module 314 and the transaction/other server interface module 316. The recommendation generator 302 cooperates with the UI creation module 306 and receives requests from it for recommended content. The recommendation generator 302 produces the recommended content and sends it to the UI creation module 306 for inclusion with the user interface created by the UI creation module 306. The recommendation generator 302 also cooperates with the social interface module 312, the search interface module 314 and the transaction/other server interface module 316 to receive context information that the recommendation generator 302 uses to process and identify the most relevant recommended content. These sources can provide information specific to the user thereby increasing the relevance of the recommended content to the user. For example, the recommendation generator 302 may receive social signals from the social interface module 312 that provide information about a user's interaction with the social network that can be used to identify more relevant recommended content. The recommendation generator 302 may receive endorsement signals from the endorsement server 112 that provide information about what the user has endorsed. The recommendation generator 302 may receive search signals from the search interface module 314 that provide information about what the user 102 has searched for and clicked upon. The recommendation generator 302 may receive transaction signals or other signals from the transaction/other server interface module 316 provide additional information about purchases the user has made or information of interest to the user. The recommendation generator 302 also cooperates with the correlation module 308 and the publisher control module 310 to receive information that can be used to adjust the ranking of recommended content or exclude content from a recommendation, respectively. In some implementations, the recommendation generator 302 identifies recommended content based upon a number of factors, for example, content ordered by the number of social annotations, content ordered by recency or timestamp, content ordered by correlation (people who annotated this also annotated that), content ordered by author and a relation to the user, content ordered by topic, content ordered by search, content ordered by commenting, posting or sharing, content ordered by endorsement, etc. More specifically, the recommendation generator 302 may provide recommended content based on, for example, a top (ordered by number of endorsements, annotations or shares) or endorsed or shared topic in the domain by one or more users, a most recently (ordered by timestamp) endorsed or shared topic in a domain, and a correlated topic (people that endorsed or shared on this topic also endorsed or shared on that topic) based on signals from the correlation module 308. The above bases for recommending content may be additionally based upon all users, a subset of users, or users within a social group. Further, the recommended content may be restricted to a current domain or source, or a group of domains and subdomains. In some implementations, the recommendation generator 302 may also introduce some randomization by adding random content. In some implementations, the recommendation generator 302 can also provide recommended content based upon the topic having the most endorsements by source; topics recommended based upon the user's group or circle in a social graph; the topic having the most endorsements on a given domain that the user will like; topic most endorsed by users that endorsed this—another related topic-sentiment analysis; and topics that people I know who endorsed also endorsed this topic. In some implementations, the recommendation generator 302 only recommends content once for a given user. In some implementations, the recommendation generator 302 also generates recommended content based in part upon "similarity." In other words, content that can be similar to the content being viewed or of interest may be identified and recommended by the recommendation generator 302. This could be alone or in combination with the other information identified above.

The one or more recommendation data store(s) or interface(s) 304 may be software, routines or storage for storing aggregated content. The recommendation data sources may be data sources that store the actual content. The one or more recommendation interfaces may be interfaces to aggregated content including searches, search results, social network information, transaction information, annotation information, endorsement information, etc. The one or more recommendation data store(s) or interfaces 304 are coupled to provide this content to the recommendation generator 302.

The user interface (UI) creation module 306 may be software or routines for creating a user interface including recommended content. The UI creation module 306 may generate and provide annotations, share boxes, recommended content, and engagement action buttons as will be described in more detail with reference to FIGS. 6A-8C. The UI creation module 306 receives the share box request 220 from the client device 104. The UI creation module 306 can provide various combinations of annotations, share boxes, recommended content, and engagement action buttons adapted to be responsive to the request received from the sharing client 110. Example user interfaces are described below in more detail with reference to FIG. 6A-13F. The UI creation module 306 sends requests for recommended content to the recommendation generator 302 and in response to the request and the context, receives recommended content from the recommendation generator 302. The UI creation module 306 combines this recommended content with the user interface constructs and sends a user interface (e.g., share box 226) to the client device 104.

The correlation module 308 may be software or routines for generating or identifying correlated recommendations. The correlation module 308 can be configured for communication with the recommendation data store(s) or interface(s) 304, the social interface module 312, the search interface module 314 and the transaction/other server interface module 316. The correlation module 308 correlates the relationship between annotations and generates information that represents likelihood of what the user may be likely to annotate. In some implementations, the correlation module 308 may generate a score that can be a linear combination of public endorsements the user has made, endorsements made by other others in the user's social graph, and endorsements by others on a first topic that also endorsed or shared us on a second topic. In some implementations, the correlated recommendations can be weighted by recency. Further, the correlation ranking can be used in combination with other categorizations identified above made by the recommendation generator 302.

The publisher control module 310 may be software or routines for receiving information from publishers about restrictions and settings for providing related content. In some implementations, the publisher control module 310 provides a variety of inputs or settings that can be received from a publisher or owner of a website. The publisher control module 310 is coupled to provide this information to the recommendation generator 302 so that it can be used as a filter to remove recommendations responsive to input from the publisher. For example, the publisher may restrict recommended content to a particular domain, sub-domain or may exclude external content.

The social interface module 312 may be software or routines for sending context requests 222B to the social network server 124 and receiving context responses 224B from the social network server 124. The social interface module 312 retrieves this context information and other social signals and information and provides it to the recommendation generator 302 and the UI creation module 306. Both of these modules 302 and 306 utilize this information in generating content or creating the user interface, respectively.

The search interface module 314 may be software or routines for sending context requests 222D to the search server 114 and receiving context responses 224D from the search server 114. The search interface module 314 retrieves the search signals and other information and provides them to the recommendation generator 302 and the UI creation module 306. As with the other interface modules, this information can be used by the recommendation generator 302 and the UI creation module 306 to identify recommended content and determine which user interface to create, respectively.

The transaction/other server interface module 316 may be software or routines for sending context requests 222E to the transaction server 122 or other servers, and receiving context responses 224E from the transaction server 122 or other servers. Again, the transaction/other server interface module 316 provides this information to the recommendation generator 302 and the UI creation module 306 for use in performing their functions.

Figure 4:
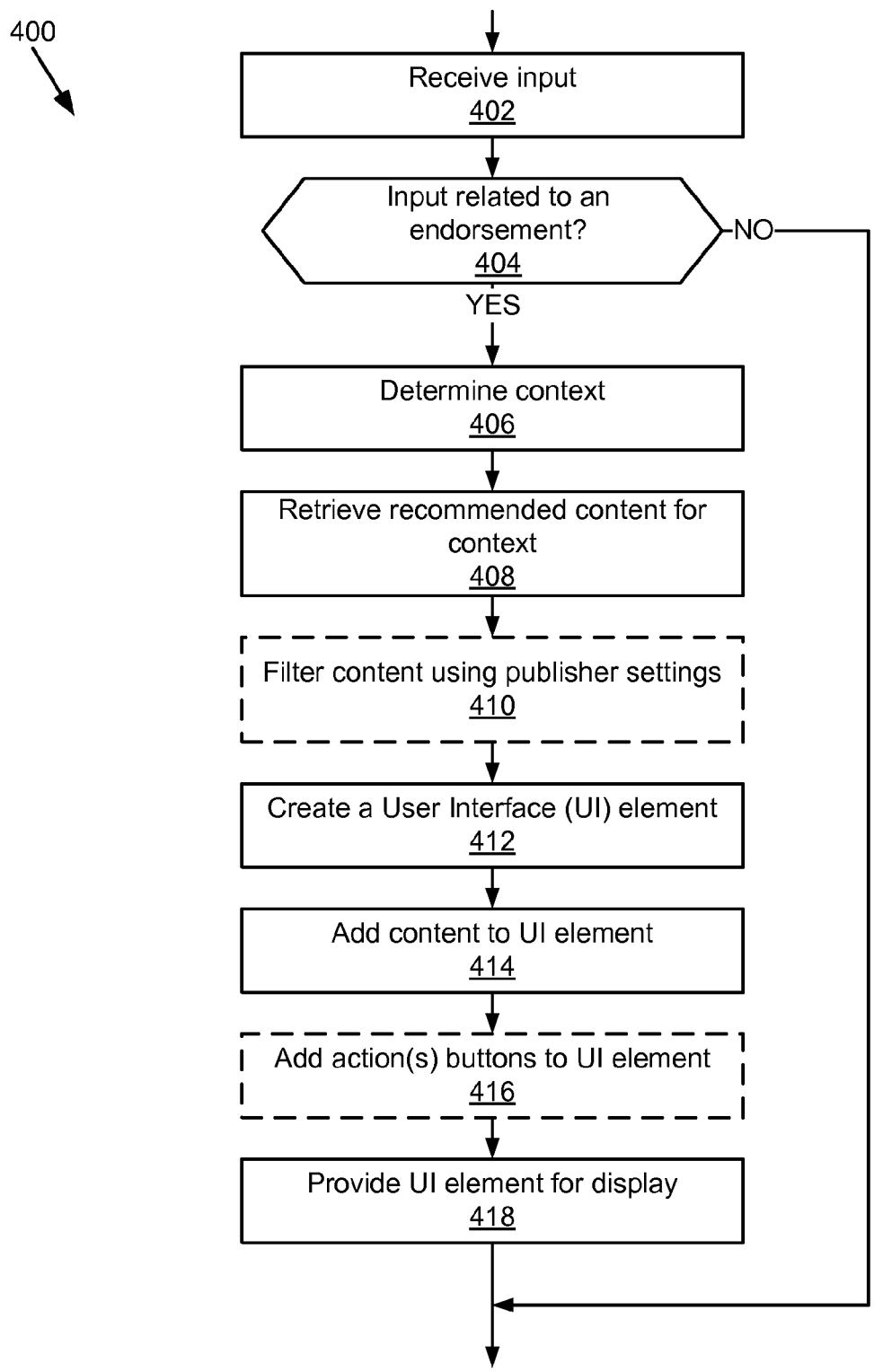
FIG. 4 is a flowchart of a first example implementation of a method for providing recommended content in a share box.

Referring now to FIG. 4, one implementation of a method 400 for presenting a user interface element (e.g., a share box) including recommended content in response to an endorsement input is described. The method 400 begins by receiving 402 an input from a first user. Depending on the implementation, the input may be a request for an endorsement button, a hover over an endorsement button or the selection of an endorsement button provided for users of the search engine 130 or a social network, for example. Next the method determines 404 whether the received input was related to an endorsement of a first content item. In some implementations, an input that can be related to an endorsement of a first content item includes a request for an endorsement button to endorse the first content item, a hover over an endorsement button for the first content item, the selection of an endorsement button to endorse the first content item, a right-click over the endorsement button or similar input. An input related to an endorsement may be associated with any input a first user can make from the web browser 202. If the input was not related to an endorsement, the method 400 ends. On the other hand, if the input was related to an endorsement, the method 400 continues to determine 406 the context of the input and the first user. For example, the method 400 determines an input context for the input, a user context describing the first user, a third context of the request or the identity of the first user. In other words, the method 400 determines any information that can be used to determine the input context in which the input related to an endorsement was made. This context information (e.g., the input context, user context and other context) can be used to retrieve and/or filter content for the annotation or insertion into the share box. For example, determining the input context may include determining the webpage being viewed, determining the portion of the web page being viewed, determining the domain or sub-domain of the webpage being viewed, determining information associated with the input, determining input associated with the endorsement button, etc. In some implementations, part of this information can be used to determine what content can be filtered and not presented in the steps below.

In some implementations, the input context includes (1) a social correlation between the first content item from the first source and a second content item from a second source and (2) a source correlation between the first source and the second source. The method 400 determines a first source where the first content item related to the endorsement input is from.

A social correlation can be data indicating that both the first and the second content items have engagement actions performed by a common user. For example, a social correlation indicates that a common user who annotates a first content item also annotates a second content item. In a further example, assume the input from the first user indicates that the first user uses a cursor to hover over an endorsement button for a video. A social correlation between the video and another content item (e.g., an article) indicates that a second user has endorsed both the video and the article. In some implementations, both engagement actions can be of the same type of actions (e.g., a common user who endorses the first content item also endorses the second content item; a common user who shares the first content item also shares the second content item, etc.) or of different types of actions (e.g., a common user who endorses the first content item also comments on the second content item; a common user who reposts the first content item also shares the second content item; a common user who endorses the first content item also reposts the second content item, etc.). In some instances, the common user can be a second user connected to the first user in a social graph. In some instances, the common user can be a second user not connected to the first user in a social graph.

A source correlation can be data indicating that the first source is correlated to the second source. For example, a source correlation indicates that both the first and second sources have engagement actions performed by a common user. In a further example, a source correlation indicates that the first user or the second user, or both, has endorsed both the first source and the second source. In some implementations, a source correlation indicates that both the first source and the second source are from the same domain. In some other implementations, a source correlation indicates that the first source and the second source are from domains specified by the same publisher.

In some implementations, the method 400 determines the user context describing the user by processing one or more of social information, endorsement information and a search history associated with the user, publisher information and a domain visited by the user, etc.

Next, the method 400 retrieves 408 recommended content according to the context in which the input related to an endorsement was made. The method 400 determines the recommended content for the first user based on the input context and/or the user context so that the recommended content matches the input context and/or the user context. For example, if the input context indicates that the first user may be viewing a particular web page, at least portions of that webpage may be retrieved and used to identify recommended content for inclusion in the share box. In such implementations, determining 406 the context includes determining the domain and/or sub-domain for the particular webpage the first user was viewing. The recommended content can be then determined using the domain name or sub-domain of that particular webpage. For example, there may be three articles on the particular topic within a particular domain. The retrieval recommended content for a first user that may be viewing one of three articles, may be to retrieve as recommended content abstracts of the other two articles provided on the same domain. Additional information like the content of the webpage, HTML tags on the webpage, recency in viewing the webpage, other web pages that have been viewed whether in the same domain or related domains can also be used to identify other recommended content. Similarly in some implementations, since the input can be associated with a particular endorsement button, the content related to that endorsement button can be identified for addition into the share box. In further implementations, additional content not visible to the first user may also be retrieved for possible inclusion in the share box. In one implementation, certain portions of the webpage may be tagged with semantic classifications provided by the publisher. That information can also be used to determine the recommended content that can be retrieved.

In some implementations, the recommended content also matches the user context describing the user. For example, if the user context indicates that the user has searched for and purchased a first product online, the recommended content may include (1) a second product similar to the first product and (2) a link to a webpage from a specific domain for the first user to purchase the second product.

Then the method 400 filters 410 the content based on publisher input or settings. Step 410 can be optional and thus shown with dashed lines in FIG. 4. In some implementations, the publisher or owner of the web domain can control the recommended content and possible actions that can be incorporated into the user interface element. There may be a variety of controls which can be afforded to the publisher and implemented by the publisher control module 310. For example, the publisher may allow or not allow the user to share content. The publisher may also limit the recommended content sources to the current domain or sub-domain. Similarly, the publisher may specify that no external content be provided as recommended content. In some implementations, information provided to the user includes additional non-visible or visible tags for semantically classified information that can be presented to the user. Once the context of the user has been determined and content has been retrieved for that context, this information can be further refined using the semantic classifications provided by the publisher. In some implementations, the information can be filtered by the publisher specifically indicating what information may be copied into the share box as recommended content. In some implementations, the endorsement/recommendation module 156 decides what content to filter based on auto crawling or some alternative mechanism. In some implementations, the information can be filtered by a combination of input from the endorsement/recommendation module 156 and the publisher. There may be a number of additional ways in which the content may be filtered based on semantic classification, requirements of the publisher, requirements of the search server 114, or requirements of other related entities.

Then the method 400 creates 412 a user interface element. The user interface element may be an endorsement button and an annotation, or may be the share box or bubble including recommended content. Examples of such user interface elements are shown and described below with reference to FIGS. 6A-8C. The method 400 continues by adding 414 the recommended content to the user interface element. For example, the recommended content retrieved in step 408 can be added to the user interface element. In some implementations, the top one or several items of recommended content can be added to the user interface element because of the limited amount of real estate. In the case where the user interface element can be an endorsement button, the added content can be the annotation. In the case where the user interface element can be a share box or bubble, the added content could be one or more items of information, links, etc. added to the share box. In some implementations, one or more engagement action buttons can be added 416 to the user interface element. Step 416 can be optional and thus shown with dashed lines in FIG. 4. For example, depending on the context, the share box may be pushed to one or more of: 1) third-party sites; 2) a stream of information from the user; 3) a post by the user; 4) a recommendation page of the user; 5) annotation storage for later presentation with the search results; 6) a micro blogging site; and 7) another site, page, database or system in which the information may be useful and valuable. Individual buttons for taking an action on the information in the share box can be added to the share box. For example, engagement action buttons may be provided to allow the user to: 1) post a comment; 2) share content; 3) follow a topic; 4) follow another user in the social network; 5) add another user to the user's social graph; 6) transition to view the recommended content; 7) view content related to the recommended content; 8) make a purchase of a product identified in the recommended content; 9) download music or video identified in the recommended content; etc. Finally, the method 400 completes by providing 418 the share box for display. In some implementations, the share box can be sent from the endorsement server 112 to the client device 104 and the information can be presented in a browser 202 at the client device 104. The user can add additional information to the share box and select anyone of the engagement action buttons such that the content in the share box may be delivered according to the action selected.

Although not shown in FIG. 4, after the share box has been presented or displayed to the user 102, the user can take a number of actions. First, the user can add additional content by inputting it to the share box. Second, the user 102 can specify other users or systems with which to share the content in the share box. This can be done following selection of the share button. In some implementations, the content from the share box can be sent to individuals or other systems. For example, the content in the share box could be e-mailed to a particular user. In another example, the information in the share box may be added to the stream of the user 102 in his/her social network. In yet another example, the content in the share box may be returned to the third party server 126, the search server 114, the endorsement/recommendation module 156 or other systems for additional processing, analytical evaluation, or presentation. In particular, the ability to easily add content and share with a multitude of other users and systems allows the user to spread content in a viral manner.

Figure 5A:
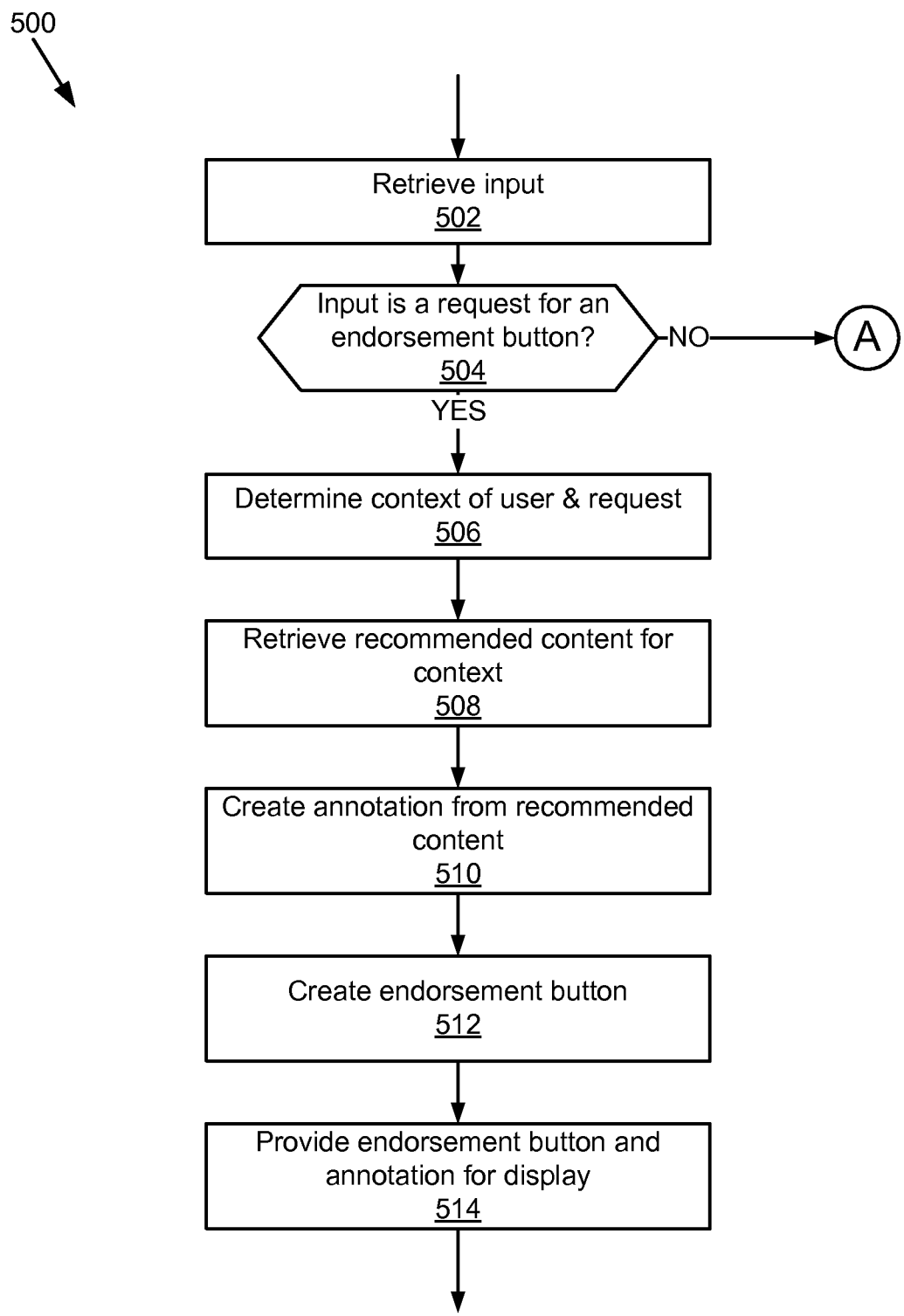
FIGS. 5A-5C are a flowchart of a second example implementation of the method for providing recommended content in a share box.
Figure 5B:
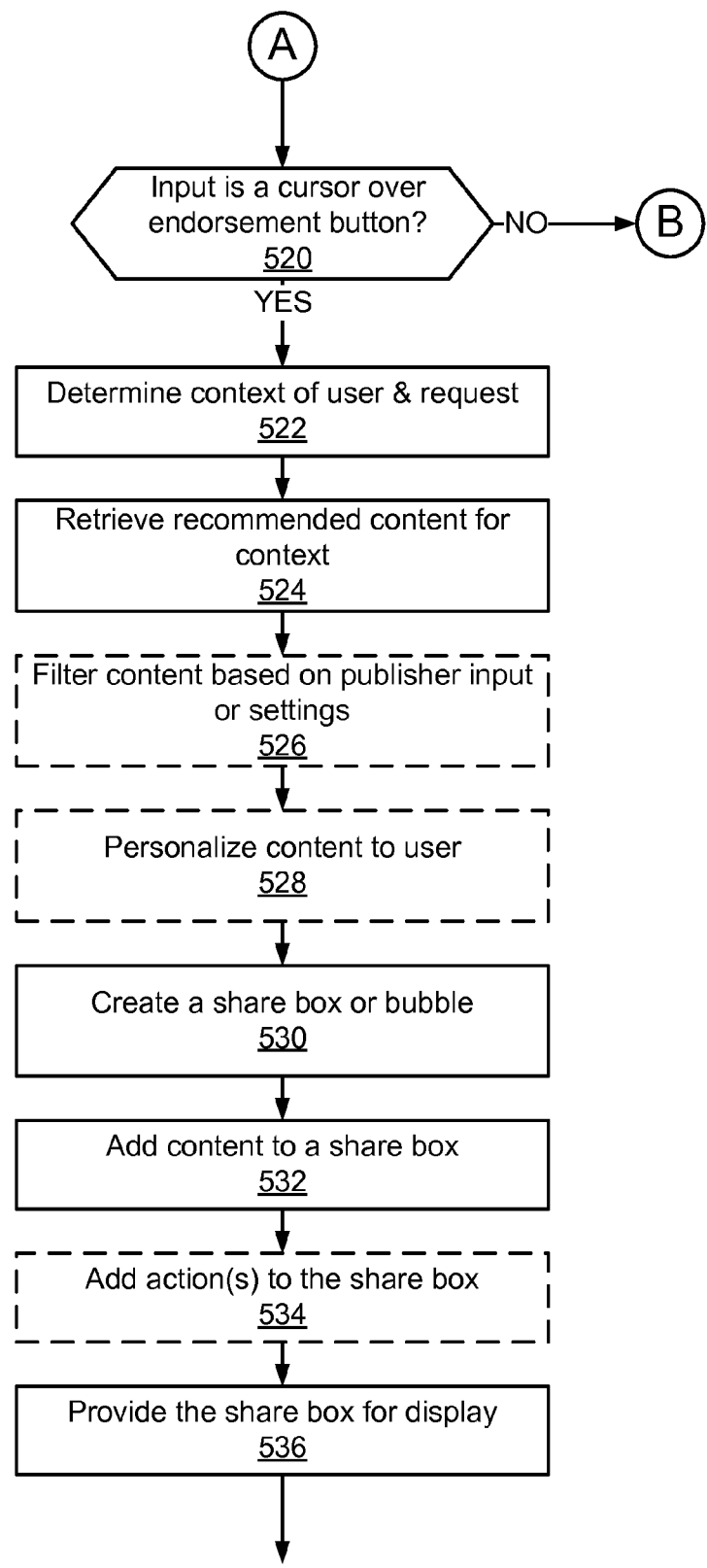
Figure 5C:
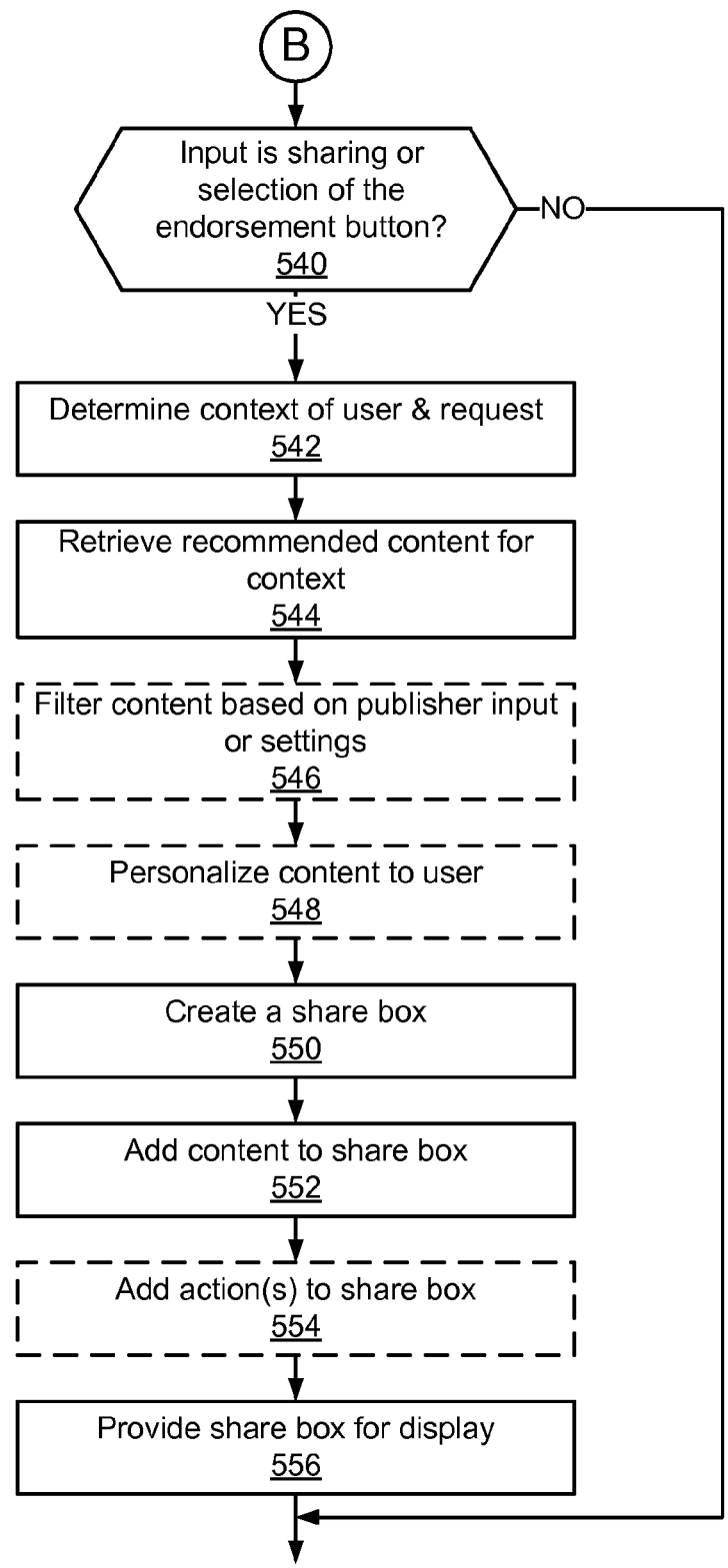

FIGS. 5A-5C show another implementation of the method 500 for providing recommended content in a user interface element. Referring now to FIG. 5A, the method 500 begins by receiving 502 an input. The method 500 then determines 504 whether the received input was a request for an endorsement button. If not, the method 500 continues to step 520 as will be described in more detail below with reference to FIG. 5B. On the other hand, if the received input was a request for an endorsement button, then the method 500 continues to determine 506 the context of the user and request. For example, the context may be determined from the social search, or endorsement signals that may indicate a webpage being viewed, the user viewing the webpage, etc. The method 500 uses the determined context to retrieve 508 the recommended content. In this instance, the recommended content can be a short statement or other information pertinent to the endorsement button. Next, the method 500 creates 510 an annotation from the recommended content. Examples of annotations including recommended content will be described below with reference to FIG. 6A-6F. The method 500 then creates 512 an endorsement button. This button can be added to a webpage and can be selectable by the user 102 to provide endorsement information to the endorsement server 112. The method 500 completes by providing 514 the endorsement button then the annotation for display in the web browser 202 of the client device 104.

If the method 500 determined in step 504 that the input was not a request for an endorsement button, the method 500 continues in step 520 of FIG. 5B. The method 500 described with reference to FIG. 5B below can be advantageous because the recommended content can be provided to the user at a time when they may be thinking about endorsing the content, but before they actually do. This has the benefit that users will start to learn that if they want recommendations, they can hover over the endorsement button 602, which will generate more endorsements.

In step 520, the method 500 determines whether the input was a cursor over an endorsement button. If not, the method proceeds to step 540 of FIG. 5C as will be described below. On the other hand, if the method 500 determined that the input was a cursor over an endorsement button, the method 500 determines 522 the context of the user and the request. As has been described above with reference to FIG. 2, the user context can include a variety of signals including social signals, endorsement signals, search signals, the domain or webpage being viewed, etc. Next, the method 500 retrieves 524 recommended content for the context. As noted above, the recommended content can be for a given domain or sub-domain, based upon the content that is most often publicly endorsed, based upon the content that may be most often shared, based upon endorsements of the user, based upon whether others in the user's social graph have endorsed content, based upon search history, click through and other click behavior, etc. The method 500 then filters 526 the content based on publisher input or settings. In some implementations, this step may be optional. The content may be filtered based on publisher input provided by the publisher control module 310 as has been described above. Next, the method 500 personalizes 528 the recommended content for the user. The content can be personalized based on information from the social network server 124, for example, using known attributes of the user, information from friends of the user, information from use of the social network by the user, information from endorsements made by the user or any other sources. Similarly, the content can be personalized based on information from the search server 114, e.g., the browsing history of the user. In some implementations, information from a profile server (not shown) that includes preferences for the user can be used to personalize the content. In other words, the method 500 customizes the content that will be added to the share box based on the identity of the user, who they are and his/her preferences. In certain implementations, the personalization step 528 can be optional. The method 500 then creates 530 a share box or bubble. Examples of the share box or bubble are shown and described below with reference to FIGS. 7A-8C. The share box or bubble can be one example of the user interface element for presenting the recommended content. Various other configurations of boxes, toolbars, buttons, and windows that have the same or similar functionality may be used instead of the share box. The method 500 continues by adding 532 the recommended and/or personalized content to the share box. Depending on the recommended content, one or more engagement action buttons can be added 534 to the share box. Finally, the method 500 provides 536 the share box including the recommended content for display, for example by sending the share box and the recommended content to the client device 104 for presentation in the web browser 202 to the user 102. The use of a share box including the recommended content can be particularly advantageous because it presents the recommended content at the right time and in the right context when it can be most valuable to the user.

If the method 500 determined in step 520 that the input was not a cursor over an endorsement button, the method 500 continues to step 540 of FIG. 5C. In step 540, the method 500 determines whether the input was the selection of the endorsement button or sharing of content. If not, the method 500 is complete, and the input can be processed by another system. On the other hand, if the method 500 determined that the input was the selection of the endorsement button or sharing, the method 500 determines 542 the context of the user and the request. This can be similar to step 522 described above, but in this case, the context includes the fact that the user has selected the endorsement button or decided to share content that may be presently being viewed. The method 500 continues by performing steps 544 to 556. Steps 544 to 556 are similar to steps 524 to 536 respectively so that description will not be repeated here.

Referring now to FIGS. 6A-6F, example implementations of user interfaces 600, 610, 620, 630, 640, 650, 660 for an endorsement button 602 and an annotation 604 are shown.

Figure 6A:
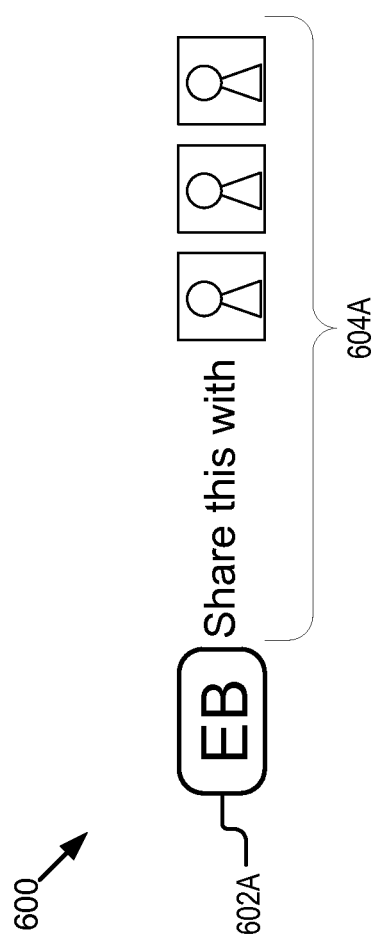
FIGS. 6A-6F are graphic representations of example implementations of user interfaces for an endorsement button with an annotation.

FIG. 6A shows one example of the user interface 600 including an endorsement button 602A and an annotation 604A. This can be an option for presenting endorsement buttons and annotations for users that are logged into a system, e.g., a social network. The annotation 604A may be positioned proximate the endorsement button 602A, in this case to the right. The annotation 604A includes a suggestion to share this (the content being viewed) with other users and includes pictures of those other users that may be retrieved from the social network. The other users may be in particular groups or the social graph of the user.

Figure 6B:
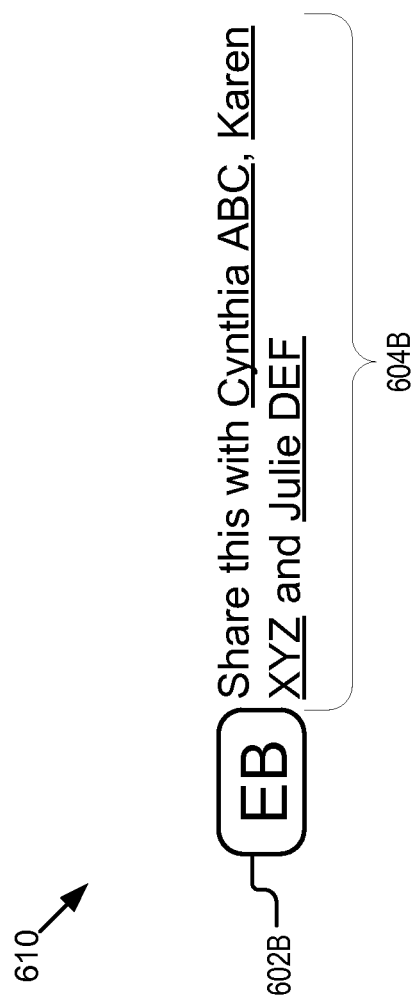

FIG. 6B shows another example of the user interface 610 including the endorsement button 602B and the annotation 604B. Again, this can be an option for presenting endorsement buttons and annotations for users that are logged into the system, for example, a social network. The annotation 604B has a similar position to that of FIG. 6A. In this example, the annotation 604B includes a suggestion that the user share this content with other users and identifies those other users by name. The names include links that can be selected by the user to provide more information about who specifically those users are.

Figure 6C:
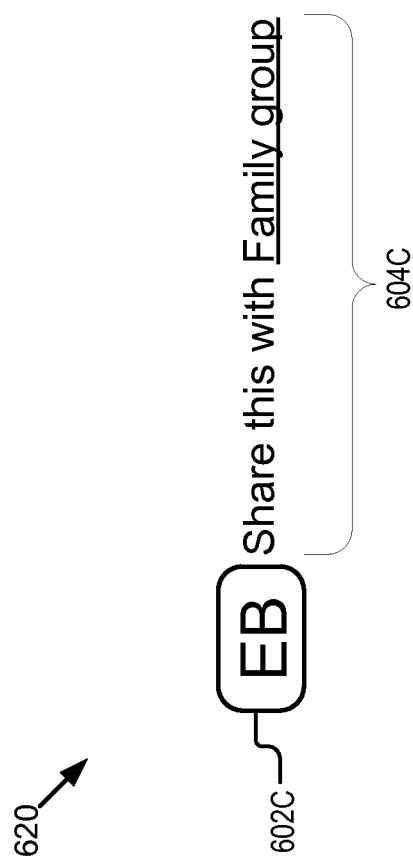

FIG. 6C shows an example of the user interface 620 including the endorsement button 602C and the annotation 604C. This can be an option for presenting endorsement buttons and annotations for users that are logged into a social network. In this example, the annotation 604C includes a suggestion that the user share this content with a group, including the user's family. The group can be identified by a name that has been given to the group by the user in the social network. The name portion of the annotation also includes a link that can be selected by the user to provide more information about who may be included within the group.

Figure 6D:
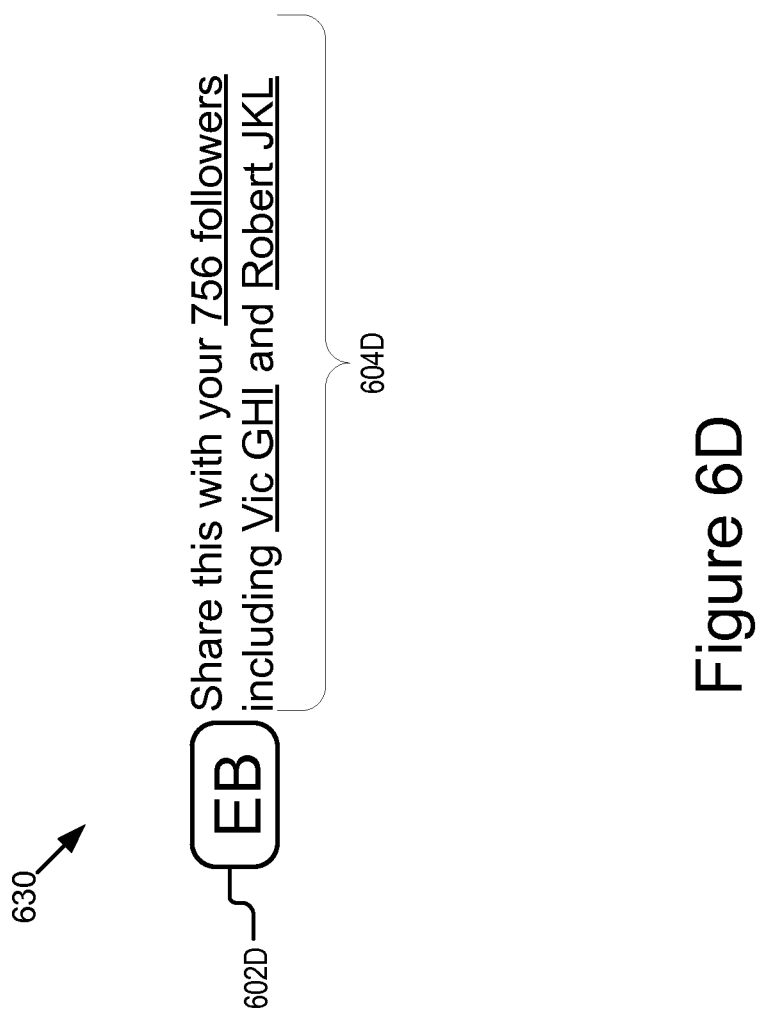

FIG. 6D shows another example of the user interface 630 including the endorsement button 602D and the annotation 604D. Again, this can be an option for presenting endorsement buttons and annotations for users that are logged into a system. The annotation 604D includes information specific to the user, in this case that the user has 756 followers, and a suggestion of who can be included within that group of followers. Certain portions of the annotation 604D can include links to access more detailed information about the annotation.

Figure 6E:
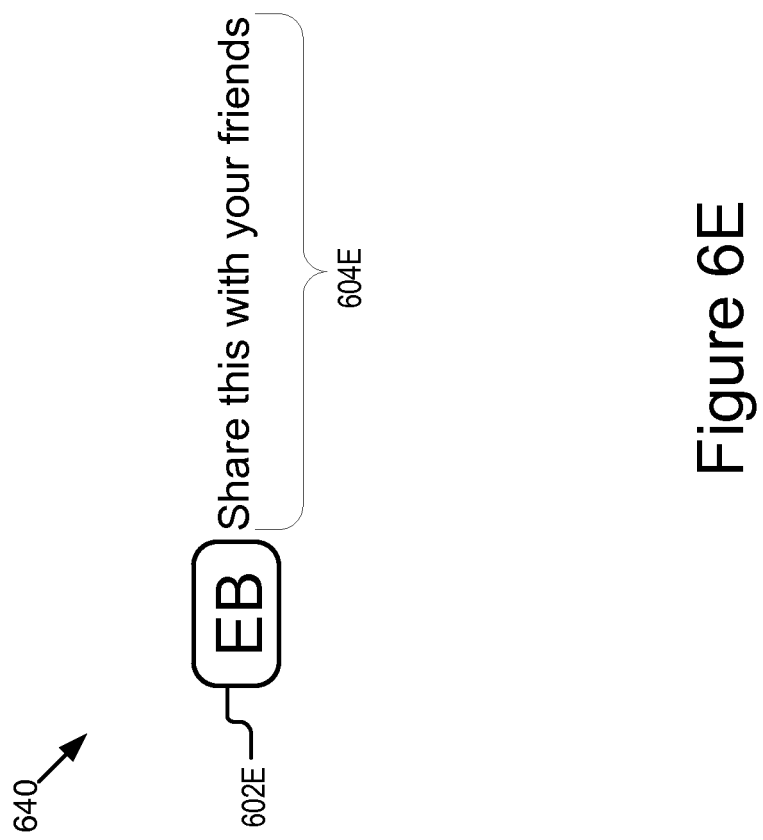

FIG. 6E shows another example of the user interface 640 including the endorsement button 602E and the annotation 604E. In this example, the annotation 604E can be for a user that may be not logged into another system. The annotation 604E includes a general suggestion that content be shared with friends since the user may be not logged into the system, no additional information from the system is added to the annotation.

Figure 6F:
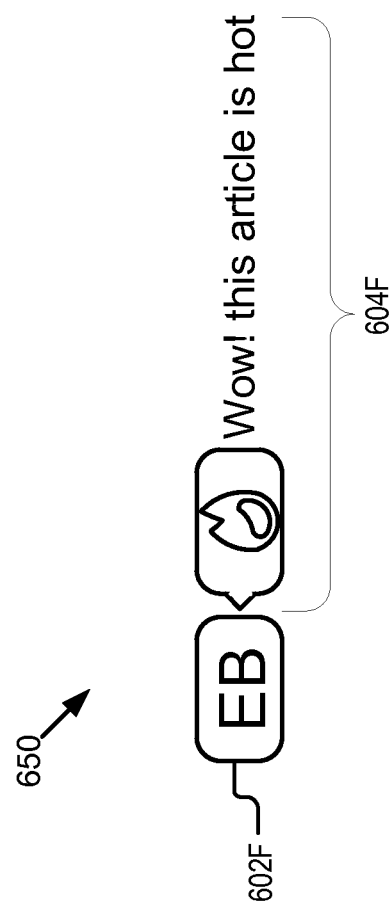

FIG. 6F shows another example of the user interface 650 including the endorsement button 602F and the annotation 604F. Again in this example, the user may be not logged into another system, e.g., a social network. The annotation 604F includes an icon, for example, an image of flame or other indicia suggesting that the information can be "hot" or popular. The annotation 604F also includes text about the continent the user can be viewing.

Referring now to FIGS. 7A-7E, example implementations of user interfaces 700, 710, 720, 730, and 740 for a share box 702 including recommended content 704 presented in response to hover over an endorsement button.

Figure 7A:
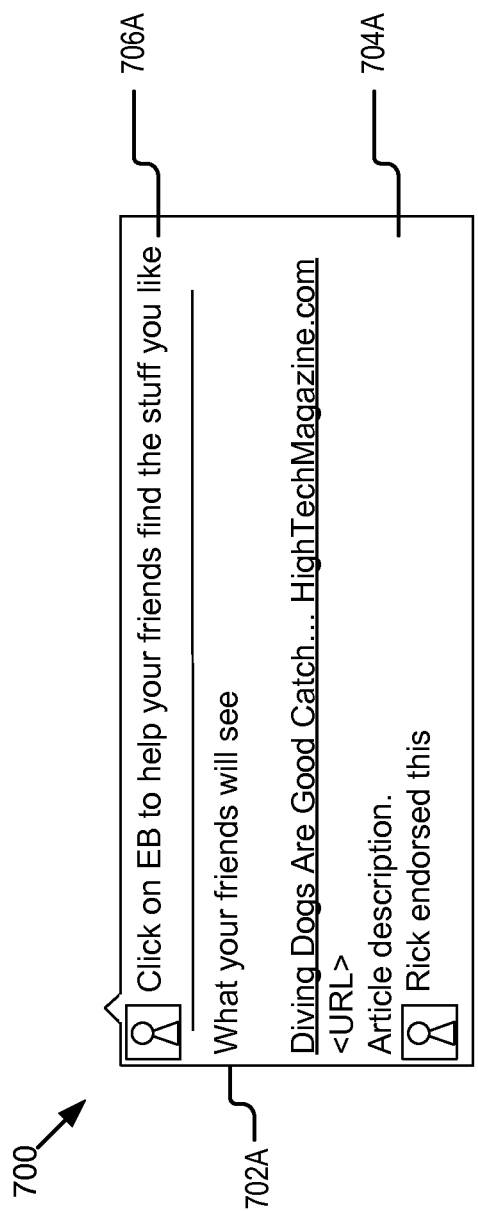
FIGS. 7A-7E are graphic representations of example implementations of user interfaces for a share box including recommended content presented in response to hovering over an endorsement button.

FIG. 7A shows another example of the user interface 700 including the share box 702A and the recommended content 704A presented in response to a cursor over an endorsement button. The user interface 700 can be an example of a share box 702A presented when the user is logged into another system, e.g., social network, and has not selected the endorsement button before. The share box 702a includes an upper portion 706A with a picture of the user and a prompt or suggestion to use the endorsement button. The share box 702A also includes recommended content 704A including a title and a link to access that content on the World Wide Web. The recommended content 704A may also include an identification of others that have endorsed the recommended content 704A and may include more information about them including their photo.

Figure 7B:
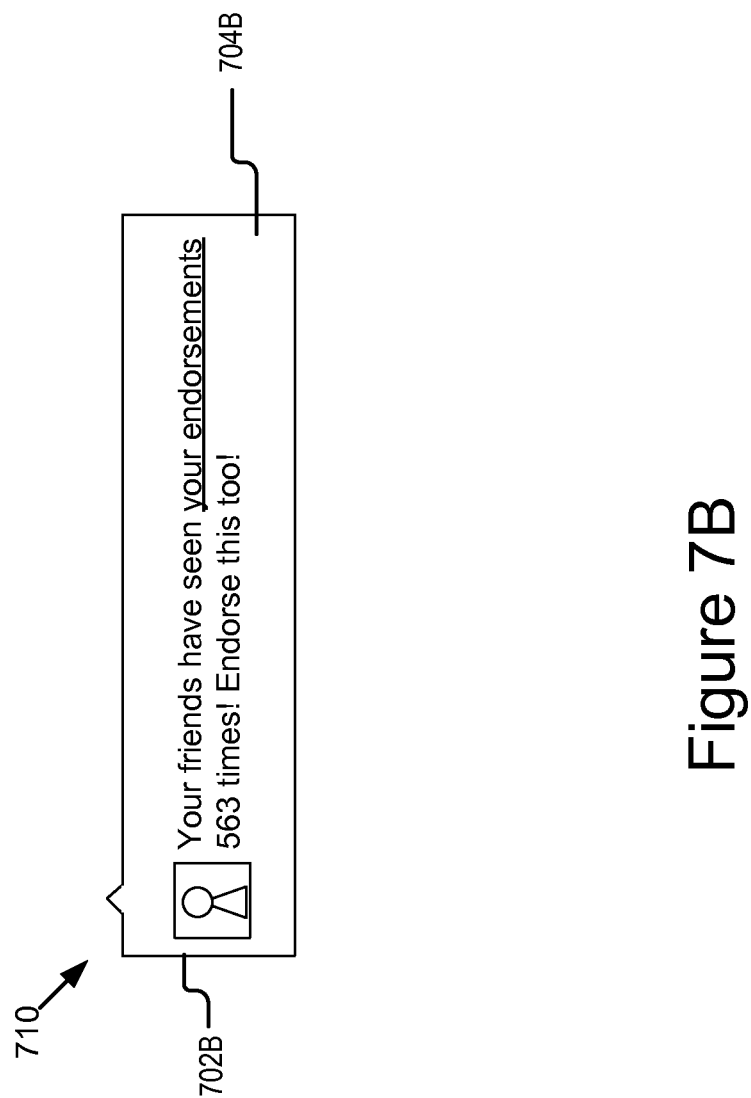

FIG. 7B shows another example of the user interface 710 including the share box 702B and recommended content 704B presented in response to a cursor over an endorsement button. The user interface 710 can be an example of the share box 702B for the case where the user is logged into another system, e.g., the social network, but has a low engagement with endorsements. The recommended content 704B provides information including a photo of the user and information about how others in the social network have utilized endorsements that the user has made. The recommended content 704B may also include links to other endorsements that the user has made.

Figure 7C:
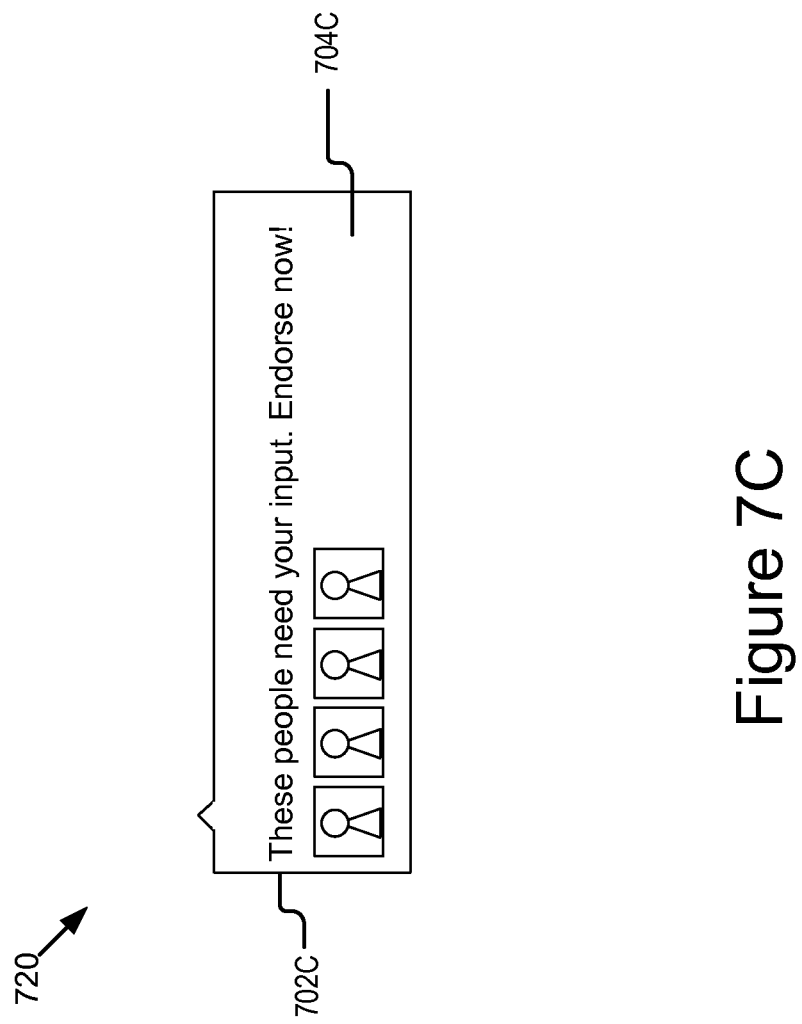

FIG. 7C shows another example of the user interface 720 including the share box 702C and recommended content 704C presented in response to a cursor over an endorsement button. Again, the user interface 710 can be an example of the share box 702C for the case where the user is logged into another system, e.g., the social network, but has a low engagement with endorsements. In this example, the recommended content 704C includes a prompt or suggestion for the user to endorse a particular topic as well as a plurality of images of other users that may be in the social graph of the user. In some implementations, the images have corresponding links so that when they are selected, information about that other user can be presented.

Figure 7D:
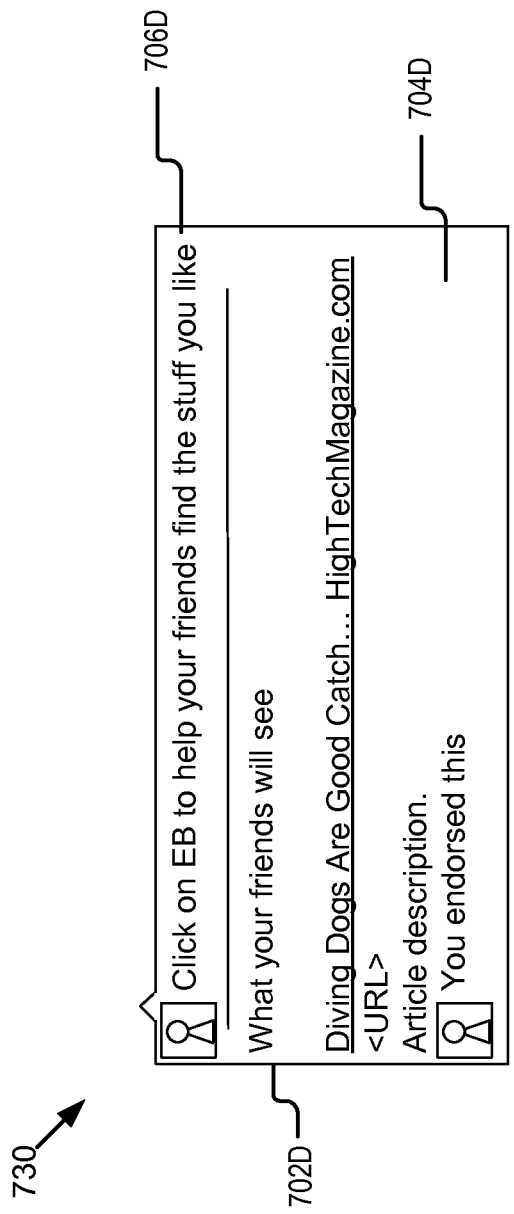

FIG. 7D shows another example of the user interface 730 including a share box 702D and recommended content 704D presented in response to a cursor over an endorsement button. The share box 702D also has an upper portion 706D with a picture of the user and a prompt or suggestion to use the endorsement button and why the endorsement button should be selected. In this example, the recommended content 704D can be provided to a user that is not logged in to another system and can be provided for educational purposes. The recommended content 704D includes an explanation of what other users will see and an example of it. The example includes the recommended content, a link to the content, and an indication that the user has endorsed it.

Figure 7E:
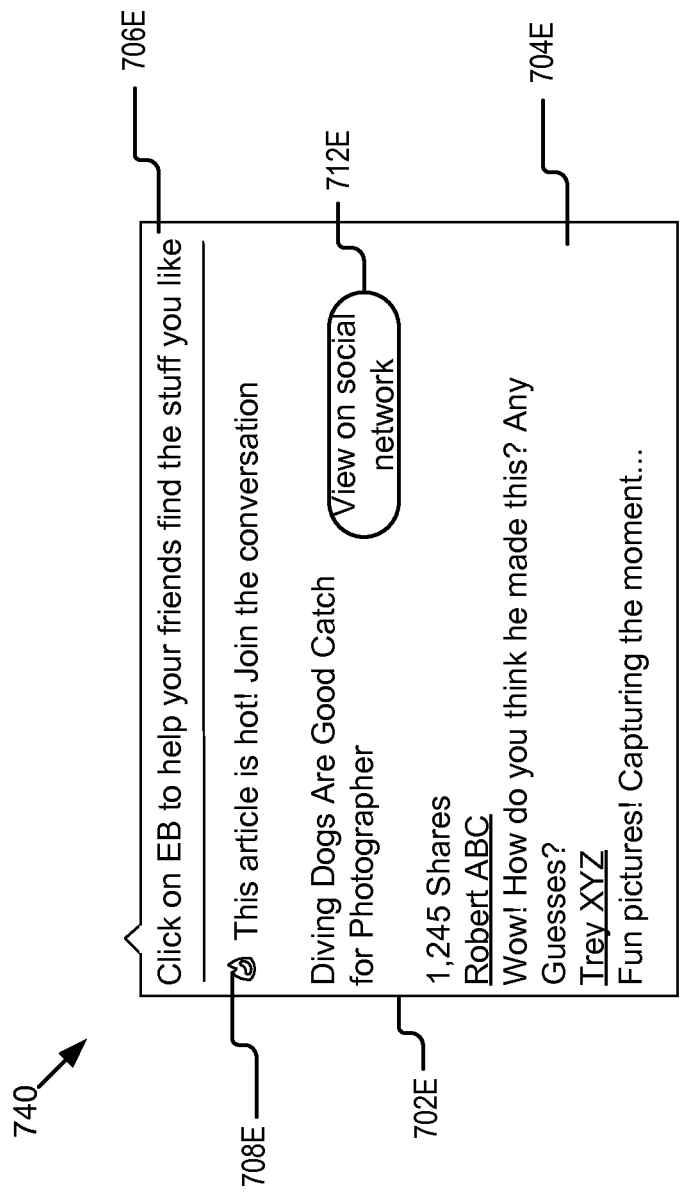

FIG. 7E shows another example of the user interface 740 including a share box 702E and recommended content 704E presented in response to a cursor over an endorsement button. The share box 702E also has an upper portion 706E with a prompt or suggestion to use the endorsement button and why the endorsement button should be selected. In this example, the recommended content 704E can be provided to a user that is not logged into another system and can be provided to promote an activity. The recommended content 704E includes a content promotion icon 708E, an engagement action button 712E that transitions to viewing more information about the recommended content 704E on another system, for example a social network, the subject matter of the recommended content, an indication of the number of times the recommended content 704E has been shared, and public posts by other users about the recommended content 704E.

Figure 8A:
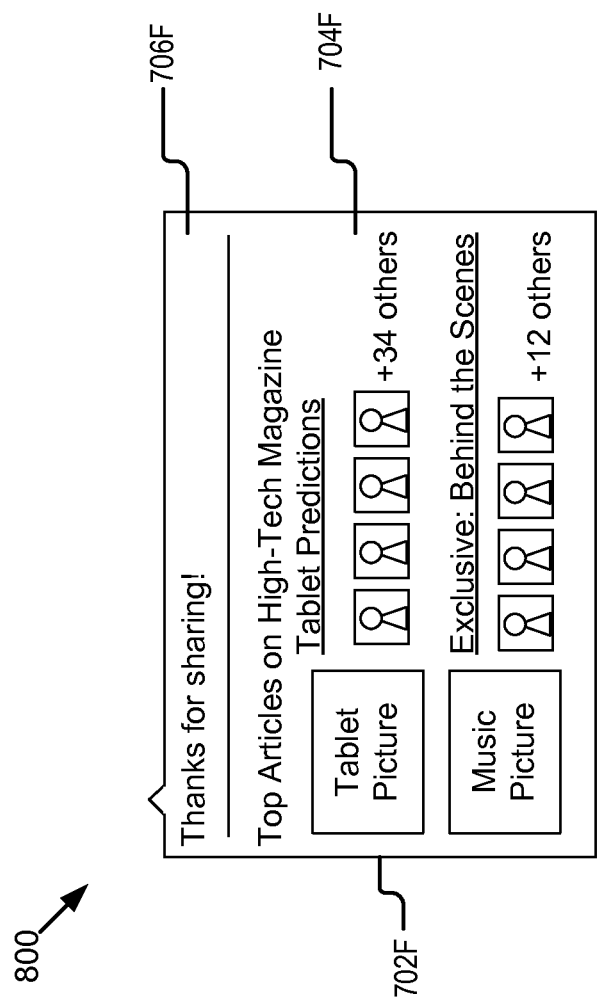
FIGS. 8A-8C are graphic representations of example implementations of user interfaces for a share box including recommended content presented in response to selection of an endorsement button or sharing of content.
Figure 8B:
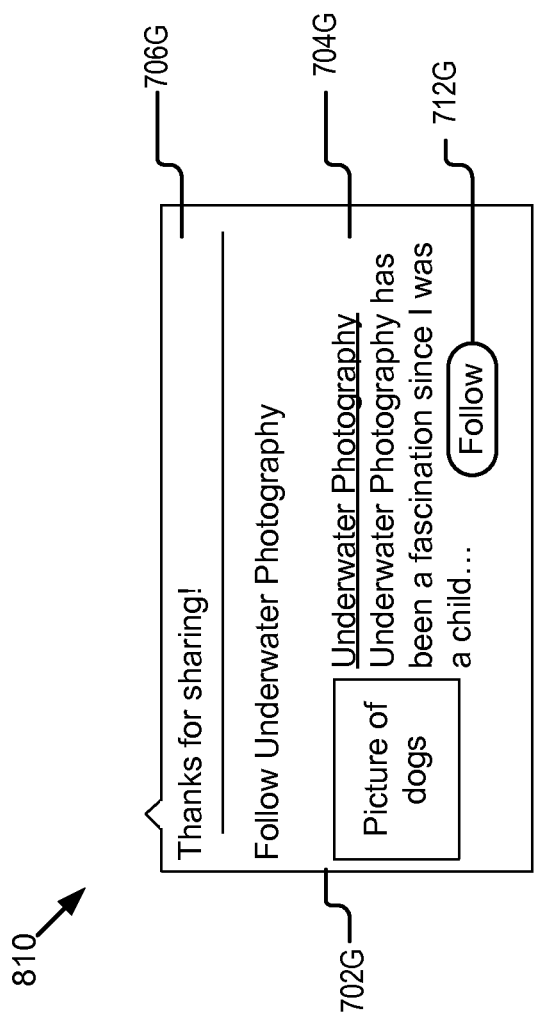
Figure 8C:
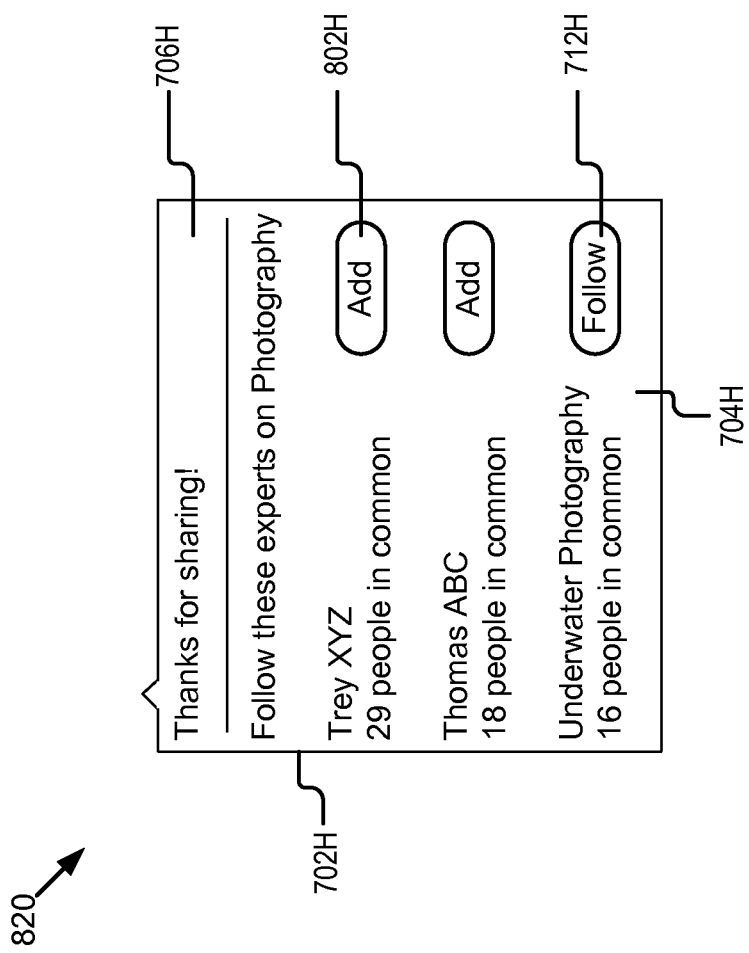

FIGS. 8A-8C are example implementations of user interfaces 800, 810 and 820 for a share box 702 including recommended content 704 presented in response to selection of an endorsement button or sharing of content.

FIG. 8A shows an example of the user interface 800 including a share box 702F and recommended content 704F presented in response to or after the selection of the endorsement button. The share box 702F also has an upper portion 706F with text acknowledging the selection of the endorsement button or sharing. In this example, the recommended content 704F can be provided to a user that is logged in to another system. The recommended content 704F includes titles of other articles on the same domain, photographs or images related to those articles, and an indication of how many others have publicly shared or endorsed the articles. In some implementations, a selected number of images of others that have endorsed the recommended content 704F can be provided. In some implementations, the images can be of others that may be in the social network of the user.

FIG. 8B shows an example of the user interface 810 including a share box 702G and recommended content 704G presented in response to or after the selection of the endorsement button. The share box 702G also has an upper portion 706G with text acknowledging the selection of the endorsement button or sharing. In this example, the recommended content 704G can be provided to a user that is logged in to another system. The recommended content 704G includes the title of an article, an abstract of text, an image or photo, and an engagement action button 712G. The engagement action button 712G when selected by the user will interact with the social network to allow the user to follow postings of the author of the recommended content 704G.

FIG. 8C shows an example of the user interface 820 including a share box 702H and recommended content 704H presented in response to or after the selection of the endorsement button. The share box 702H also has an upper portion 706H with text acknowledging the selection of the endorsement button or sharing. In this example, the recommended content 704H can be provided to a user that is logged in to another system, e.g. a social network. The recommended content 704H includes an invitation to follow experts in photography which was the topic of the content being viewed before selection of the endorsement button. The recommended content 704H includes identification of experts on photography and an indication from the social graph of the user the number of people that the expert and the user have in common. The recommended content 704H also includes an engagement action button 802H to add the identified expert(s) to the social graph of the user. The recommended content 704H also may include an engagement action button 712H that when selected by the user will allow the user to follow postings on the topic of underwater photography.

In the implementations described above with reference to FIG. 5A-8C, input that relates to an endorsement can include requesting a webpage, requesting a webpage including an endorsement button, input proximate the endorsement button, a cursor over an endorsement button, a selection of an endorsement button, whether the content has been endorsed by any user, whether a particular user has endorsed the content, whether the user has made any endorsements to any content, whether the user has made a low number of endorsements, posting related to content, or sharing content. More specifically, the endorsement context may include the timing of the selection of the endorsement button, events that occur before selection of the endorsement button and events that occur after the selection of the endorsement button. For example, endorsement buttons may be provided alone or with annotations. Similarly, different recommended content may be presented in the share box before selection of the endorsement button (around the time of cursor over) as compared with recommended content that can be provided after selection of the endorsement button.

In some implementations described above, the recommended share box 702 includes mechanisms for users to view more detail about the recommended content. Some of these mechanisms can be provided to the user before they endorse a particular webpage or portion of content. In the event a user does not selected the endorsement button 602 and instead views the recommended content and transitions to a different or second webpage or system, a second endorsement button 602 will be presented on the second webpage or system. In some implementations, the endorsement/recommendation module 156 will process inputs from the user and if the endorsement button on the second webpage is selected, the endorsement/recommendation module 156 can present one or more message to disambiguate which content the user intended to endorse. For example, messages to the user could include: "We noticed you just came from page X, would you like to endorse that page?" "Would you like to endorse both the current page enter prior page?" Or "Would you like to endorse both only this page?" In some instances, the endorsement/recommendation module 156 may present a list of prior web pages that the user has visited and allow them to endorse one, all, or selected pages. Furthermore, endorsement/recommendation module 156 may receive and process other signals in addition to the domain or sub-domain of the content being viewed by the user. For example, other interfaces may be provided to allow the user to indicate how interesting the content is. A drop-down dialog box may be provided to allow the user to provide an endorsement rating of 1 to 5, 1 being the lowest and 5 being the highest and most interesting. The level of interestingness that particular content has may also be automatically determined (e.g., how long a user views or engages a particular page or content). If the user views the page for a short period versus a long period (dwell time), the endorsement/recommendation module 156 automatically determined that can be an endorsement with a low level of interestingness. This dwell time could also be used by the endorsement server 112 to classify and boost recommendations. This automatic measurement could be performed on the client side through the use of cookies with the state or web history or could be tracked from the server-side. In other implementations, the identity of the referring page could be encoded into a token that includes a hash portion of the URL. The endorsement button on the second page could then decode the token to determine what the referring page was at the time the user transition to the recommended content. This approach can be advantageous because it minimizes the traffic and data that are sent to the endorsement server 112.

Referring now to FIGS. 9-13F, a webpage and example states in which the endorsement button, annotations and the share box including recommended content are presented to the user are shown and described.

Figure 9:
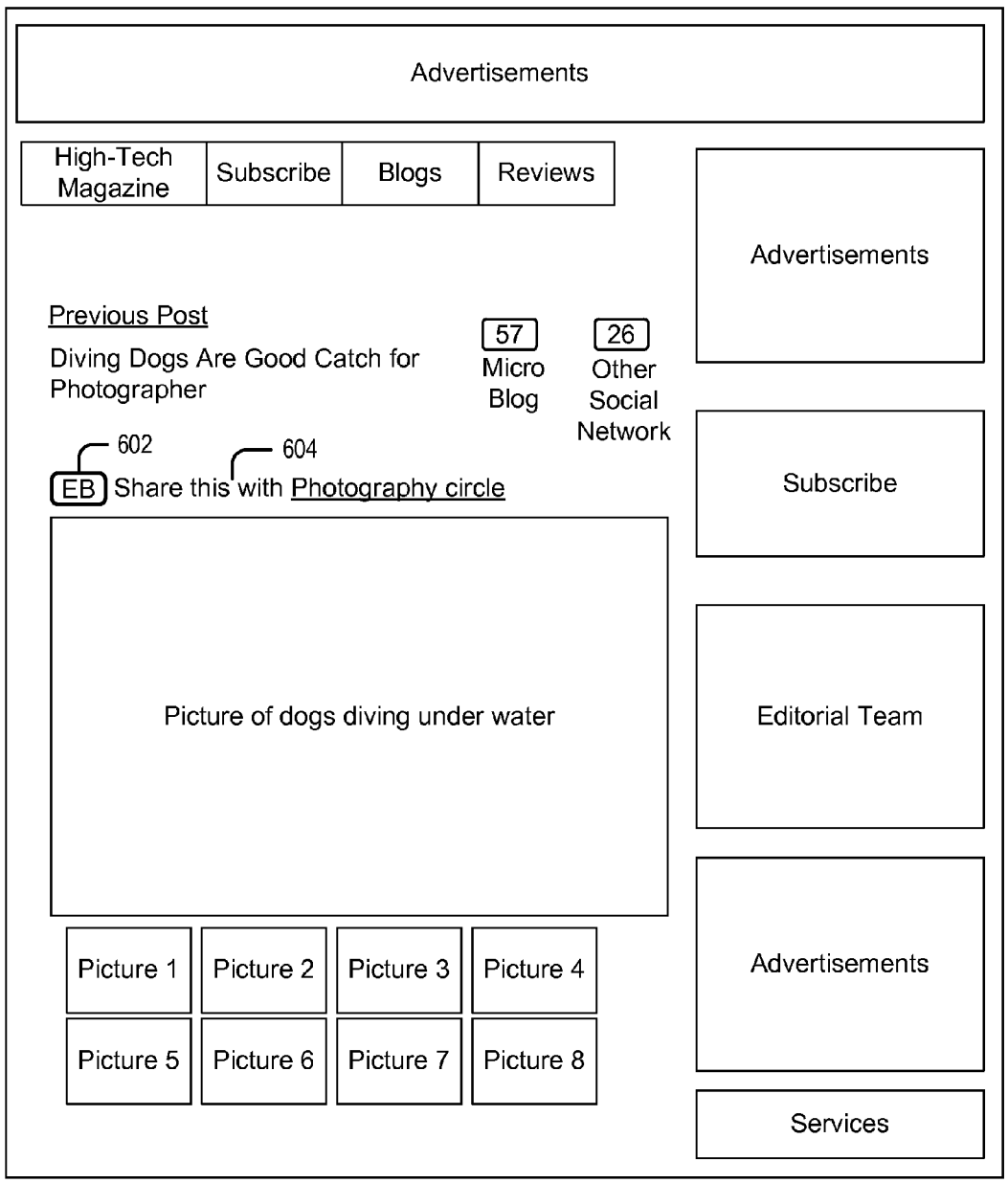
FIG. 9 is a graphic representation of an example implementation of a webpage including an endorsement button.

FIG. 9 shows an example webpage 900 including the endorsement button 602 and an annotation 604. The example webpage 900 has various sections for advertisements, and selectable buttons to navigate over the domain or other content. This particular webpage 900 presents a photograph and thumbnail images of other pictures. The webpage includes content selections for subscriptions, editorial teams, services and other information. In addition to the endorsement button 602 and the annotation 604, the webpage 900 provides navigation buttons for transitioning to other posts, accessing micro blogging sites and accessing other social networks.

Figure 10A:
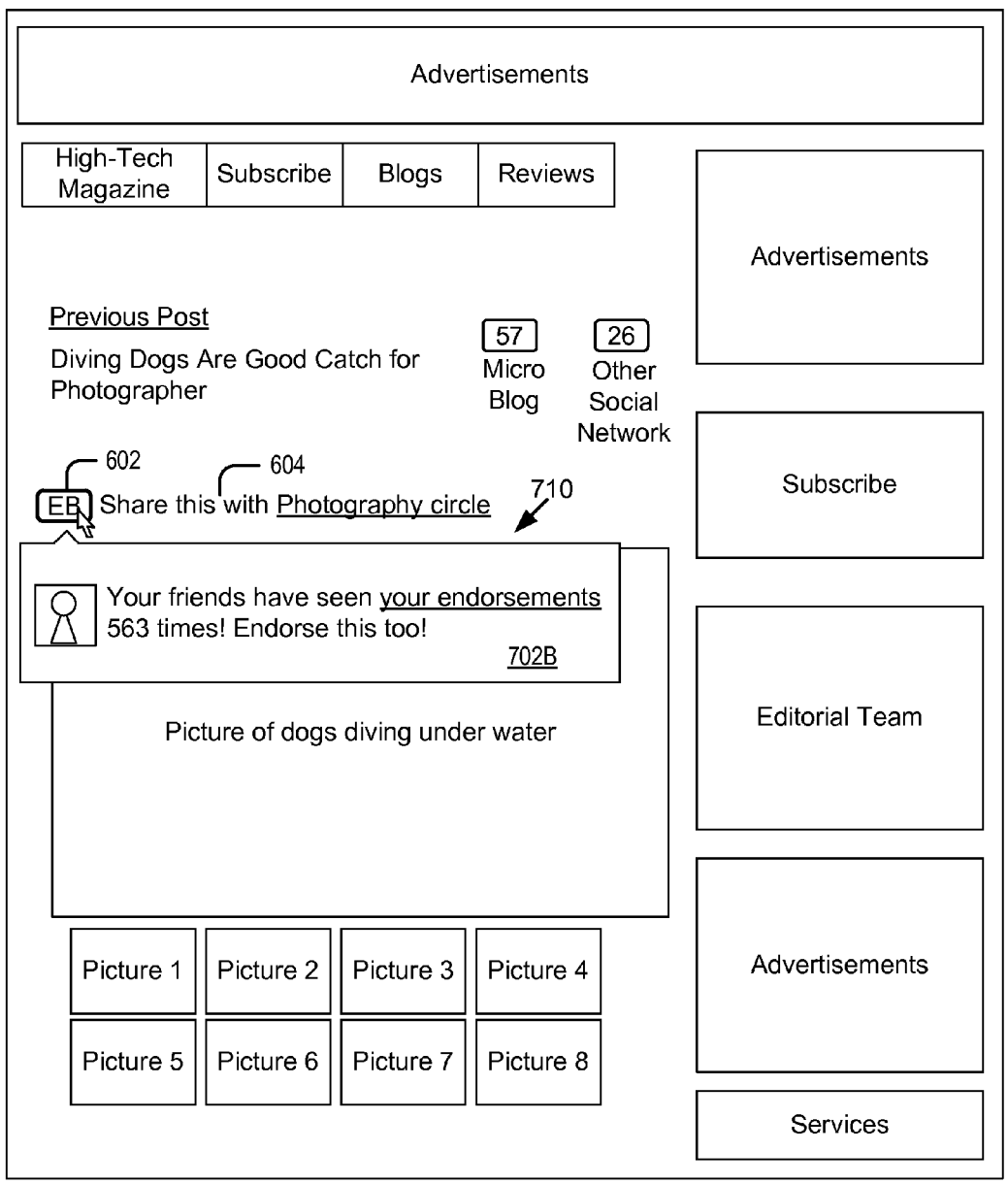
FIGS. 10A and 10B are graphic representations of an example implementation of a webpage and promotional content presented in response to hovering over an endorsement button.
Figure 10B:
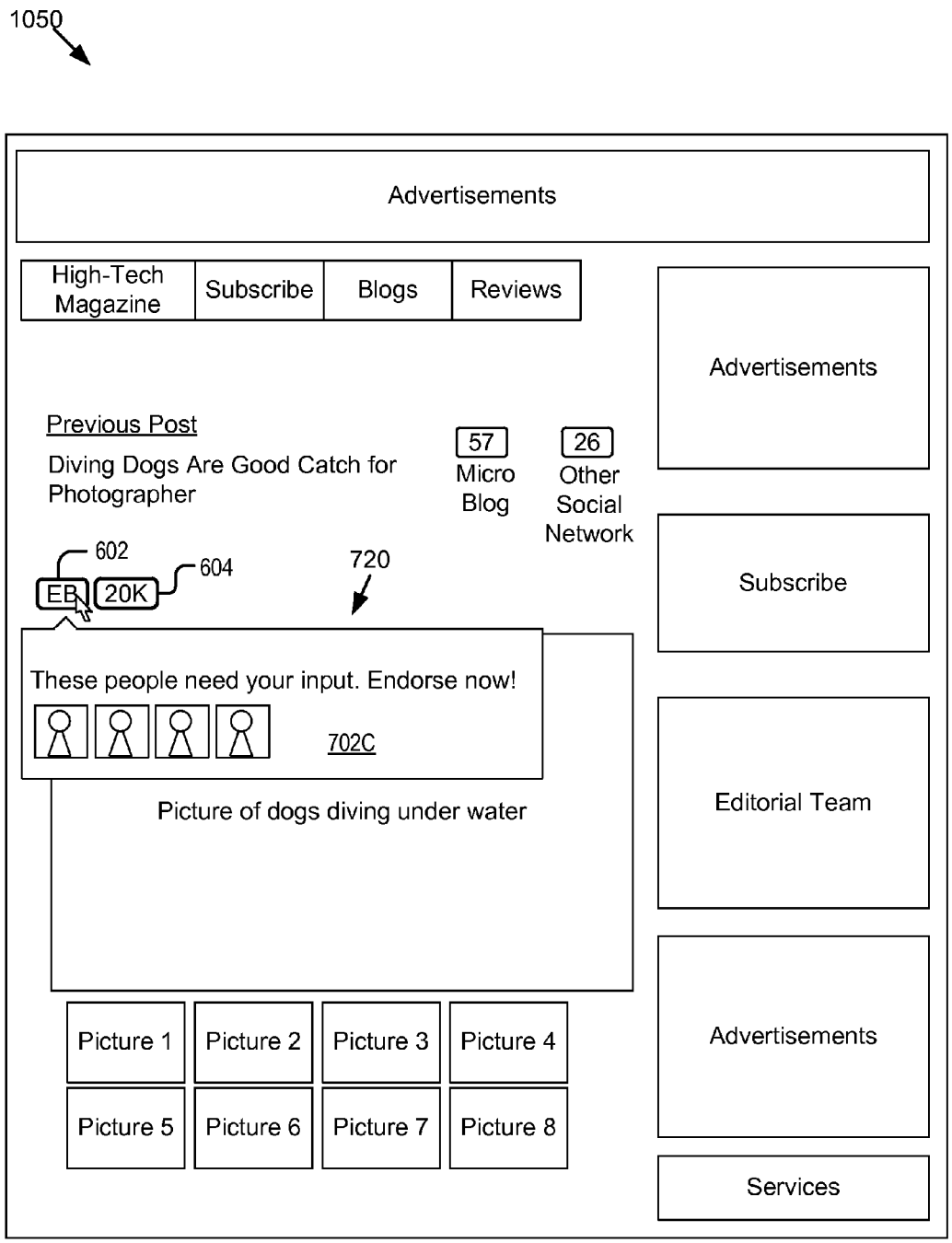

FIGS. 10A and 10B are example implementations 1000, 1050 of the webpage 900 of FIG. 9 showing example share boxes 702B, 702C after the user has moved the cursor over the endorsement button 602. For example, FIG. 10A shows the webpage 900 of FIG. 9 with the user interface 710 of FIG. 7B overlaid in response to the user moving the cursor over the endorsement button 602. Similarly, FIG. 10B shows the webpage 900 of FIG. 9 with the user interface 720 of FIG. 7C overlaid on the webpage 900 in response to the user moving the cursor over the endorsement button 602.

Figure 11A:
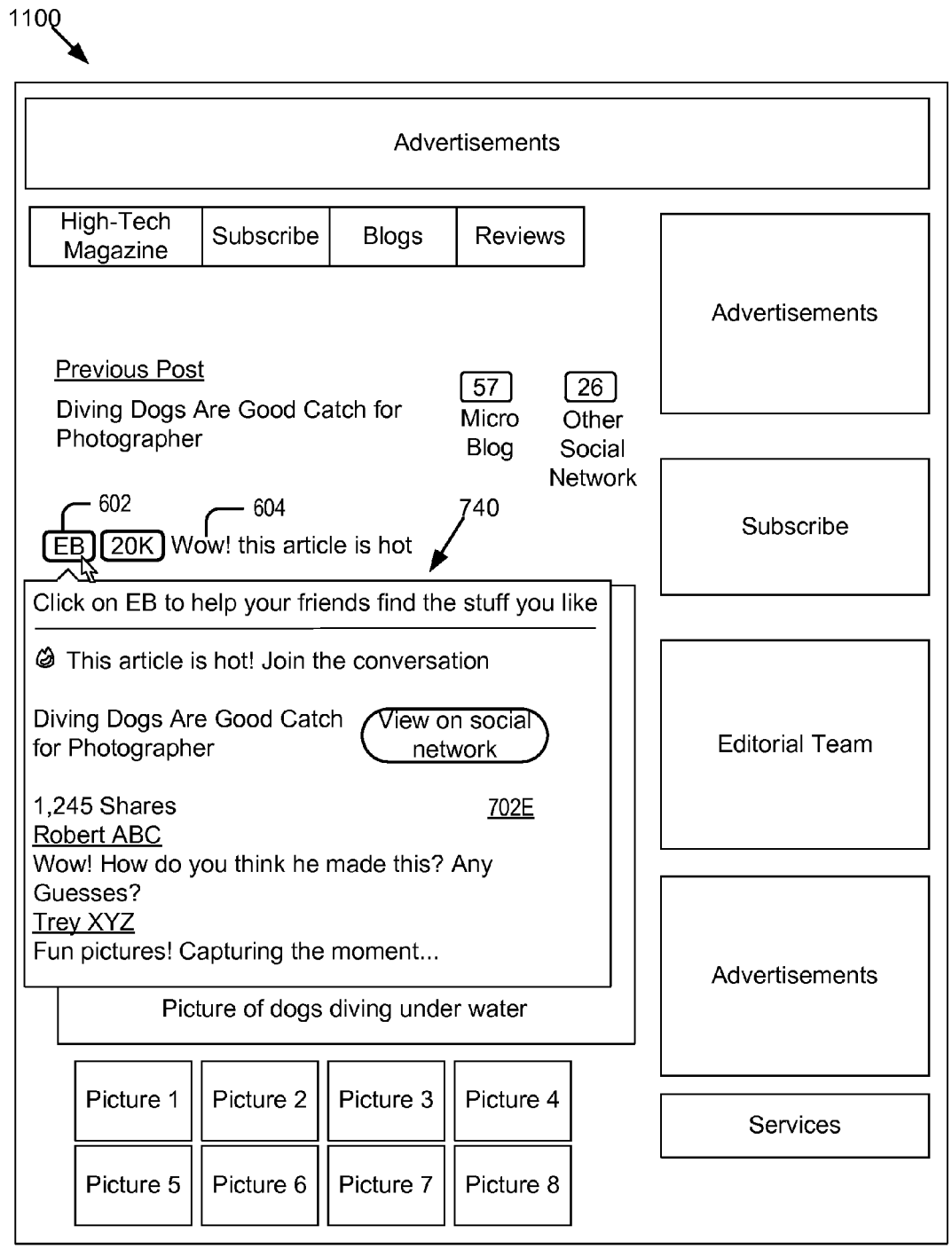
FIGS. 11A and 11B are graphic representations of an example implementation of a webpage and a share box including recommended content presented in response to hovering over an endorsement button.
Figure 11B:
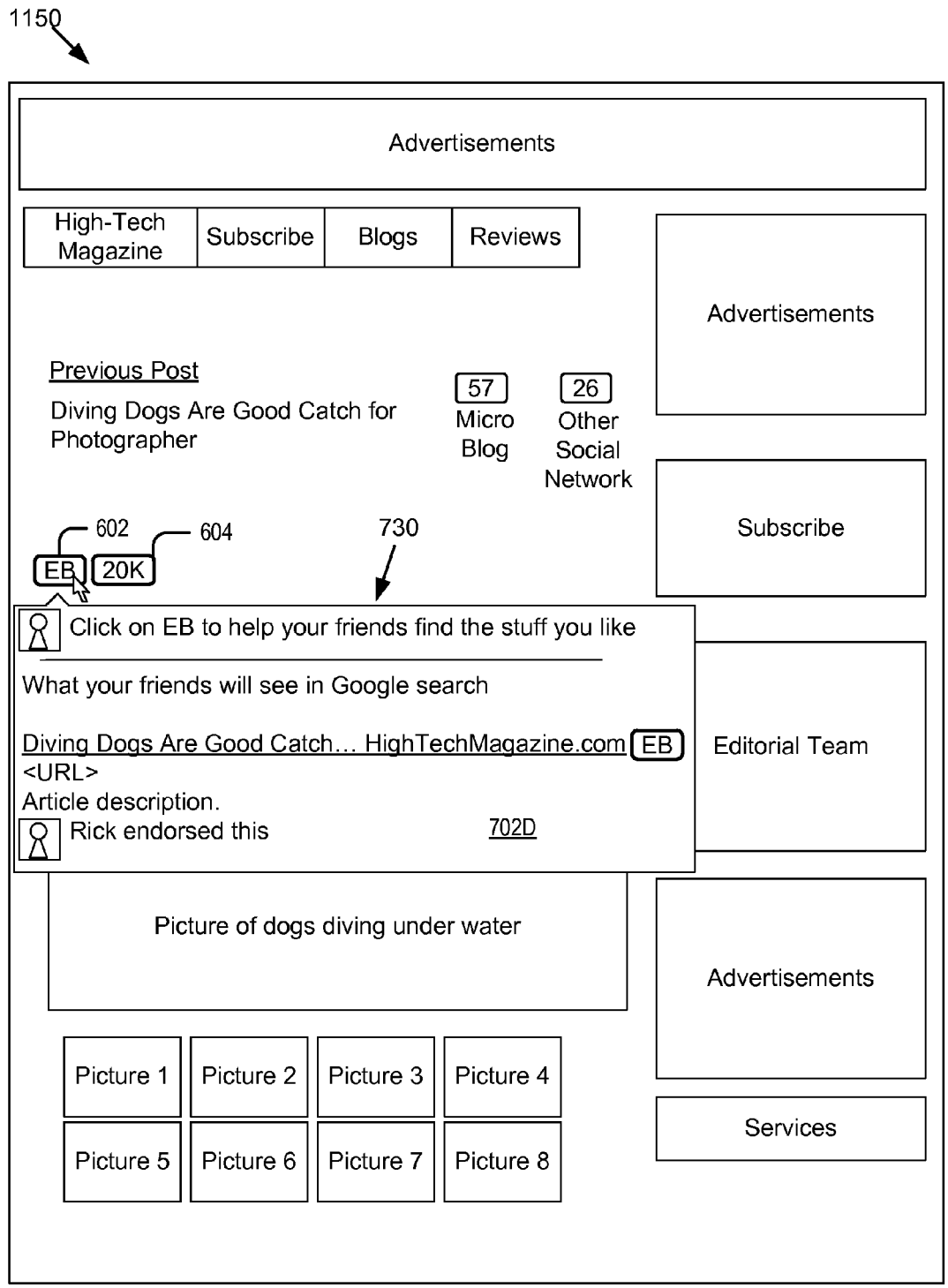

FIGS. 11A and 11B are additional example implementations 1100 and 1150 of the webpage 900 of FIG. 9 showing example share boxes 702E, 702D after the user has moved the cursor over the endorsement button 602. For example, FIG. 11A shows the webpage 900 of FIG. 9 with the user interface 740 of FIG. 7E overlaid in response to the user moving the cursor over the endorsement button 602. Similarly, FIG. 11B shows the webpage 900 of FIG. 9 with the user interface 730 of FIG. 7D overlaid on the webpage 900 in response to the user moving the cursor over the endorsement button 602. FIGS. 10A-11B illustrate a particular advantage of the present disclosure which is that the recommended content 702 can be positioned on the user interface in close proximity to the endorsement button 602. Moreover, in some implementations rather than presenting the share box 702 in response to a cursor movement, the share box 702 may positioned and field with recommended content and placed near the endorsement button 602—in other words, without need for the user to move the cursor over the endorsement button 602.

Figure 12A:
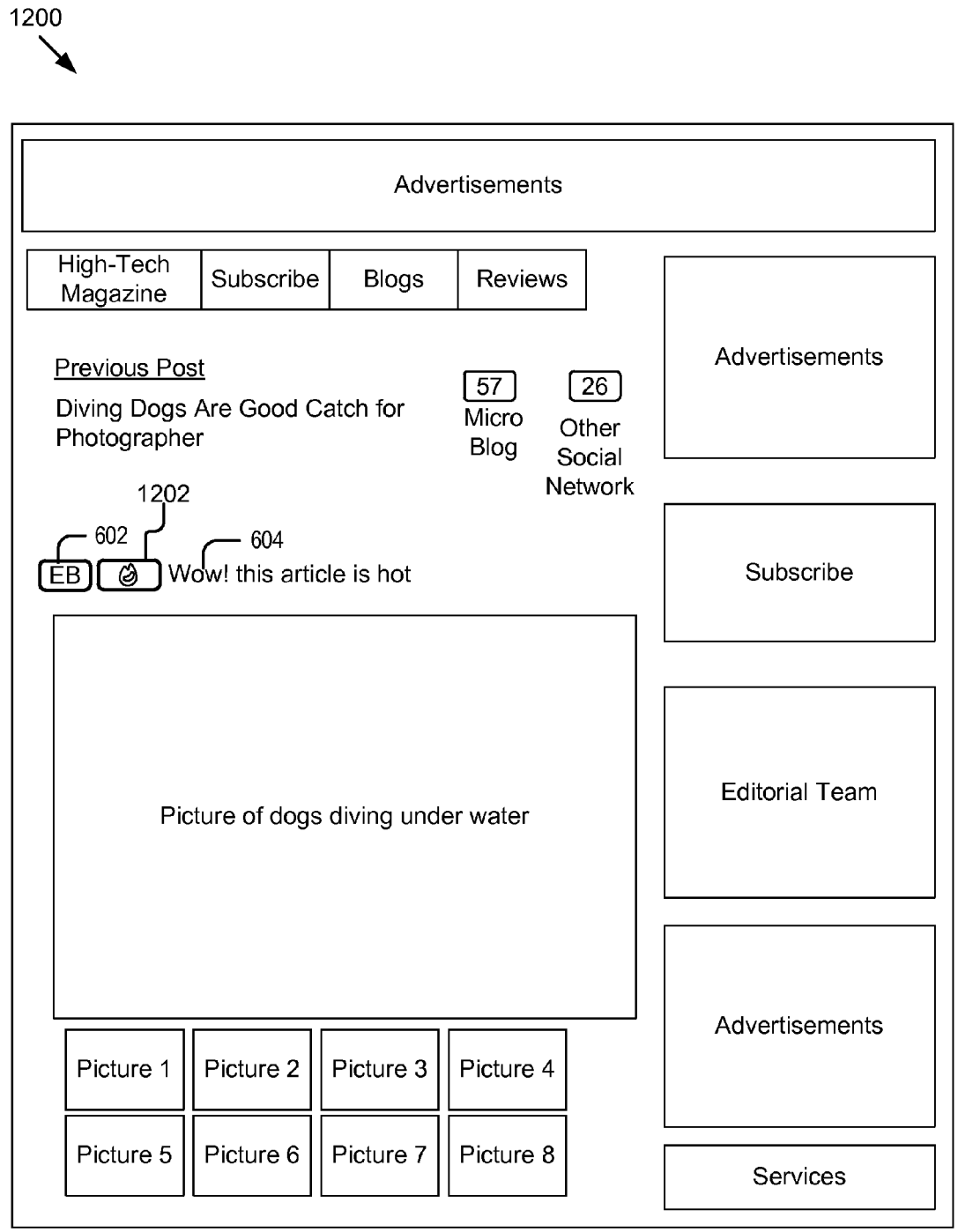
FIGS. 12A-12D are graphic representations of an example implementation of a content icon and associated information presented in response to hovering over an endorsement button.
Figure 12B:
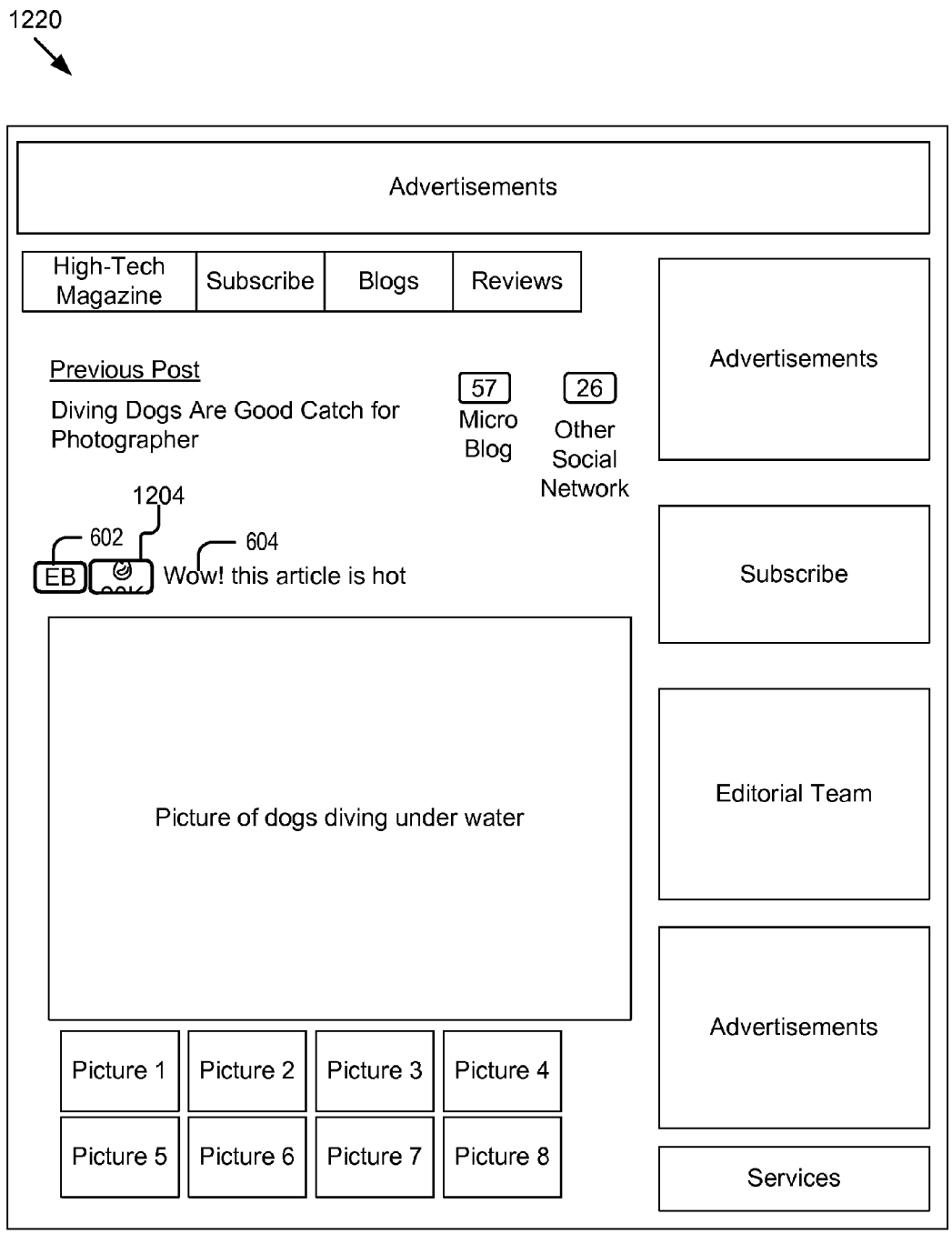
Figure 12C:
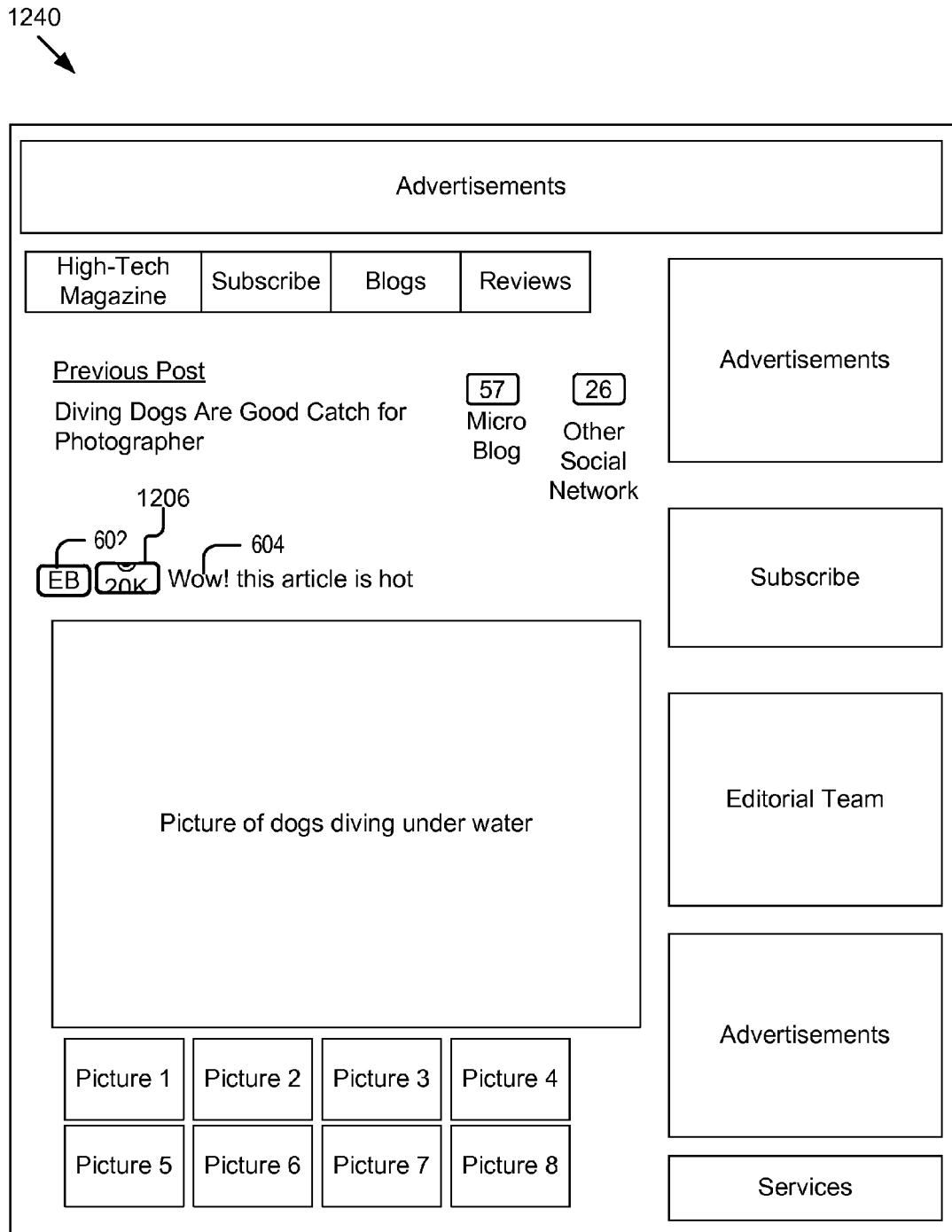
Figure 12D:
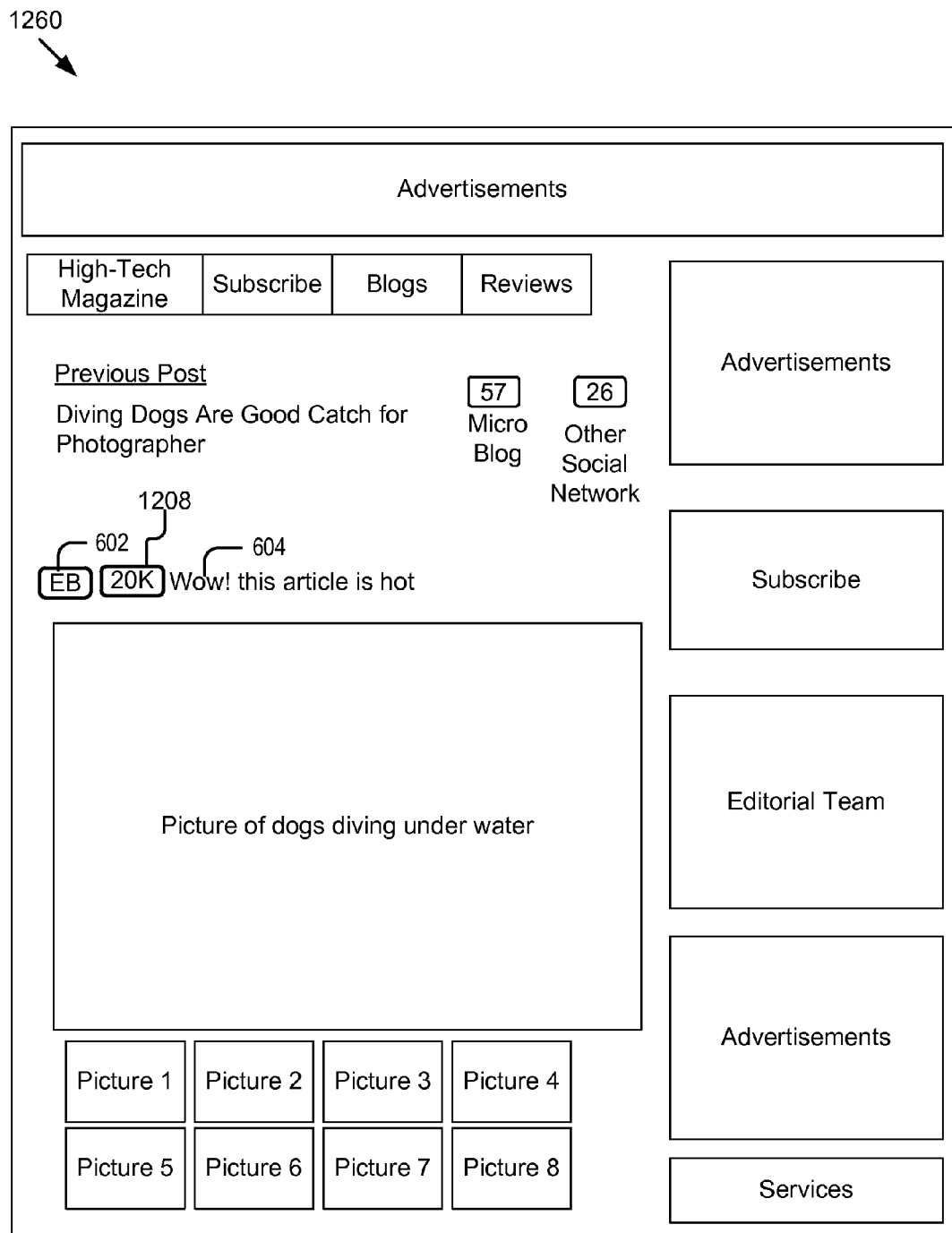

FIGS. 12A-12D show an example implementation 1200, 1220, 1240 and 1260 for a content icon 1202, 1204, 1206 and 1208 and associated information presented in response to hovering over the endorsement button 602. More specifically, FIG. 12A shows the webpage 900 of FIG. 9 with the endorsement button 602, the content icon 1202 and the annotation 604 as part of the webpage 900. This interface 650 can be similar to that described above with reference to FIG. 6F. FIGS. 12A-12D illustrate the transition of the content icon from content icon 1202 to content icon 1204 to content icon 1206 and then finally to content icon 1208. This transition can be responsive to a cursor over input upon either the endorsement button 602 or the content icon 1202. The transition of content icon 1202 to content icon 1208 provides a mechanism to give the user more information about why particular content is popular or "hot." In this example, content icon 1202 can be a symbol indicating that the particular content on the website may be popular. However content icon 1208 indicates the number of endorsements that the content has received. In other implementations, the numerical value could be used to indicate endorsements, instances of sharing the content, posts about the content, etc. The content icon 1204 of FIG. 12B shows the original icon and a portion of the numeric value. The content icon 1206 of FIG. 12C shows a portion of the original icon and a greater portion of the numerical value.

FIGS. 13A-13F show example implementations of the webpage 900 and the share box 702 including recommended content 704 presented in response to selection of an endorsement button 602 or the sharing of content.

Figure 13A:
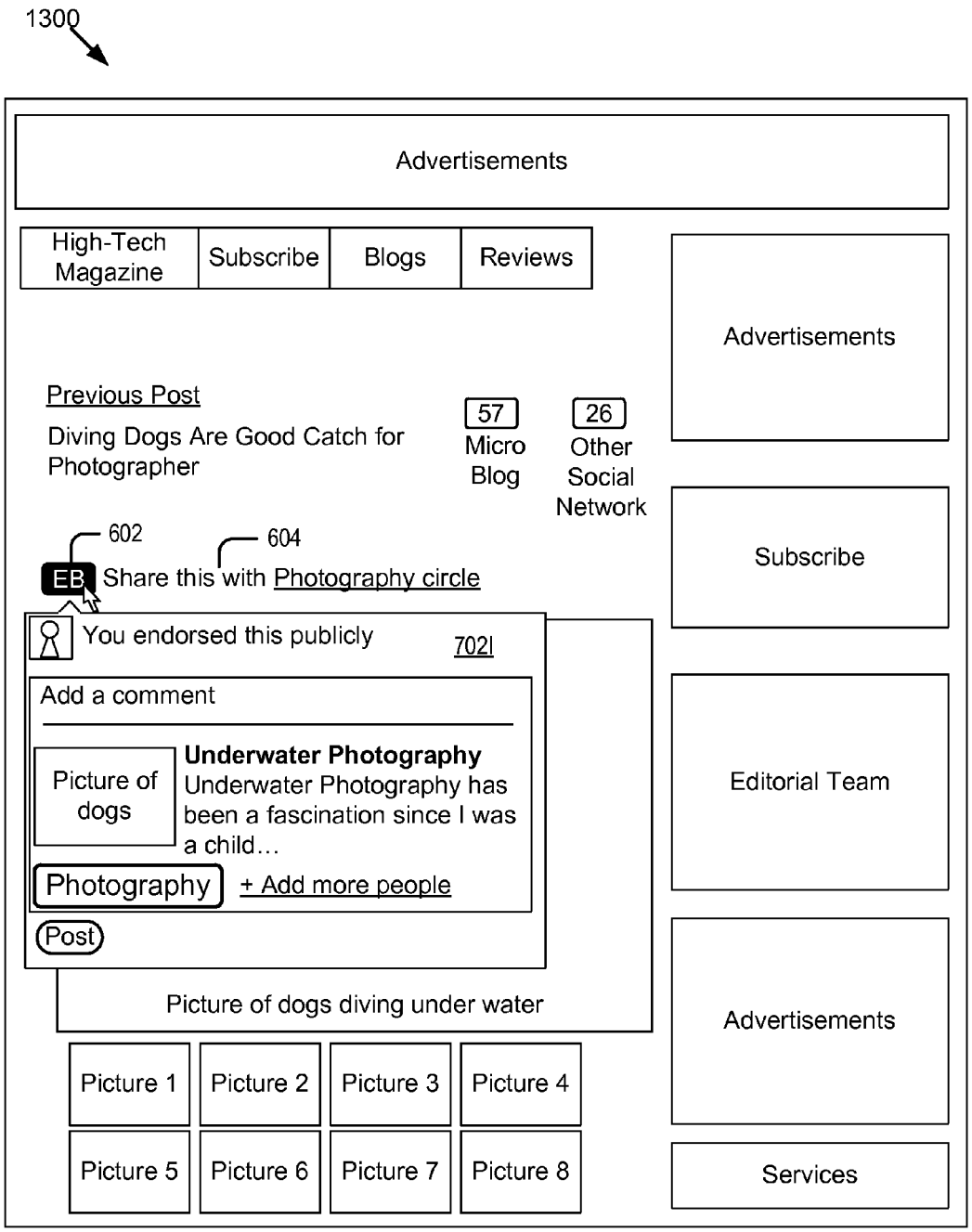
FIGS. 13A-13F are graphic representations of example implementations of a webpage and a share box including recommended content presented in response to selection of an endorsement button or sharing of content.
Figure 13B:
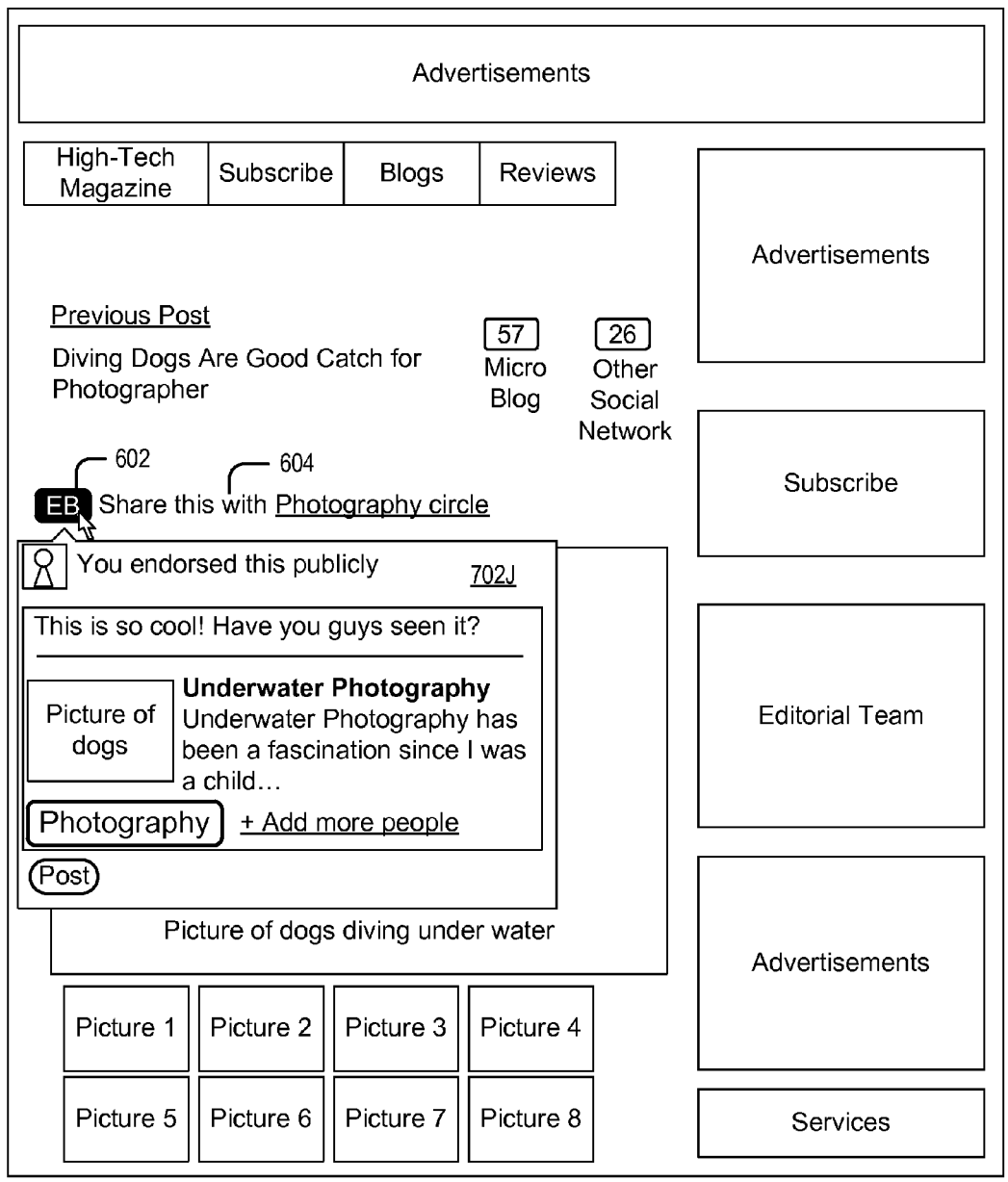

FIG. 13A shows an example implementation 1300 of the webpage 900 of FIG. 9 with the share box 702I overlaid in response to the user selecting the endorsement button 602. This implementation of the share box 702I includes an area for the user to add a comment as well as the recommended content 704 and the engagement action buttons for a photography group and to post the comment. FIG. 13B shows an example implementation 1310 of the webpage 900 of FIG. 9 with the share box 702J. The share box 702J can be similar to the share box 702I, but also includes a comment that has already been added near the top of the share box 702J. The share box 702J is one example for the appearance of the share box 702 after the user has posted a comment.

Figure 13C:
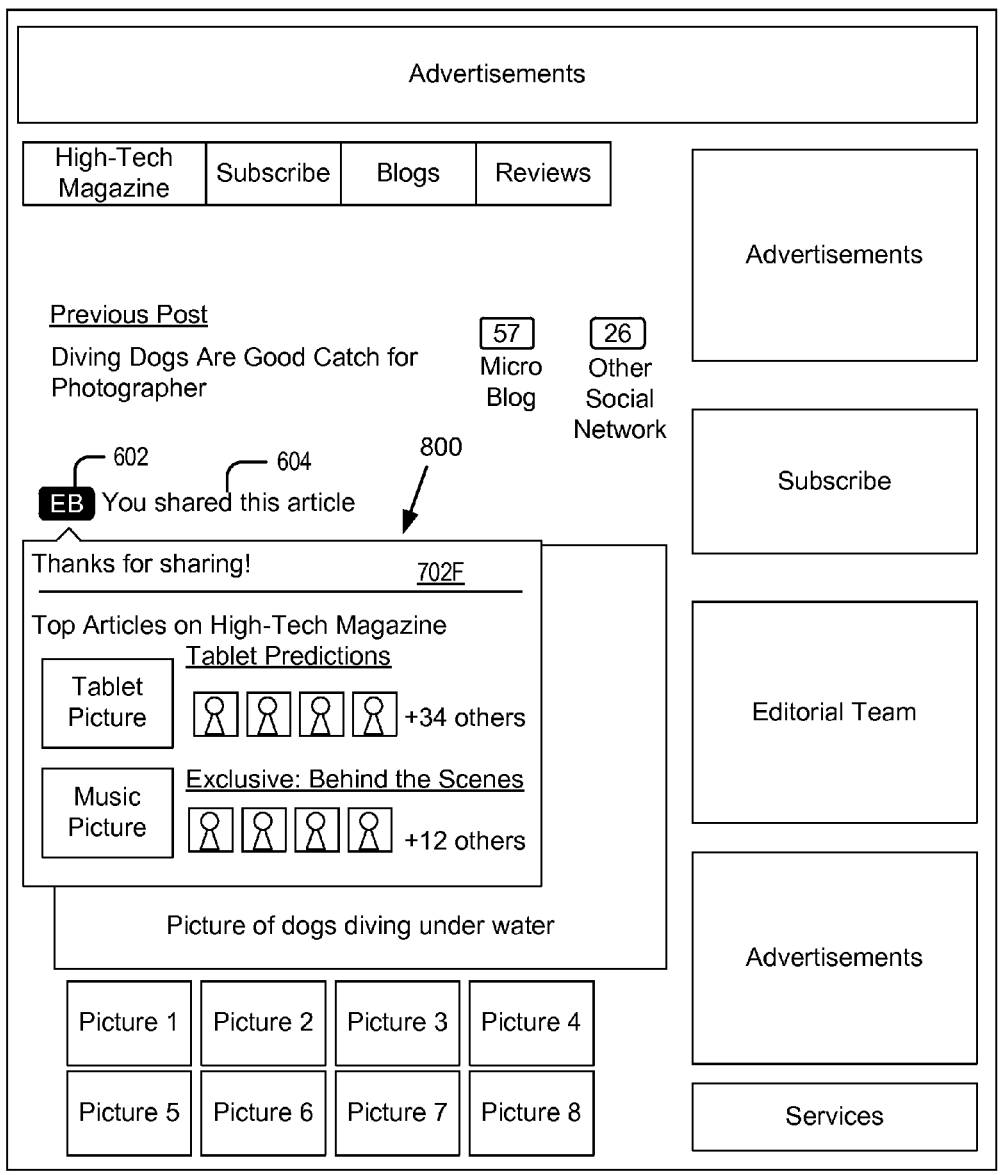

FIG. 13C shows an example implementation 1320 of the webpage 900 of FIG. 9 with the user interface 800 of FIG. 8A overlaid in response to user selection of the endorsement button 602.

Figure 13D:
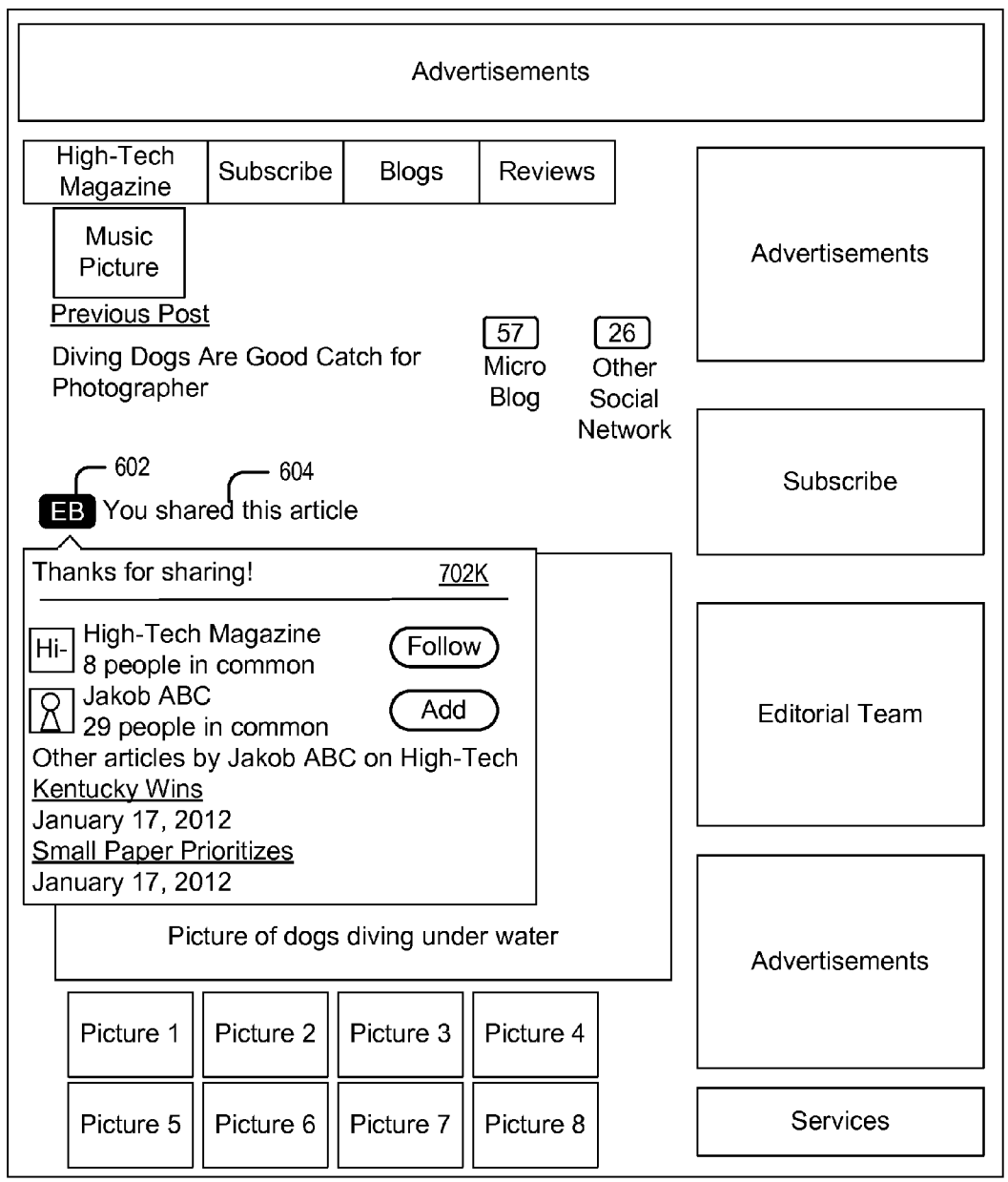

FIG. 13D shows an example implementation 1330 of the webpage 900 of FIG. 9 with a share box 702K overlaid in response to user selection of the endorsement button 602. The share box 702K has similar functionality to a combination of functions from share box 702A, 702E and 702H because it includes links to related articles, a follow action button, an add action button, identification of topics and other users with indicia of common users.

Figure 13E:
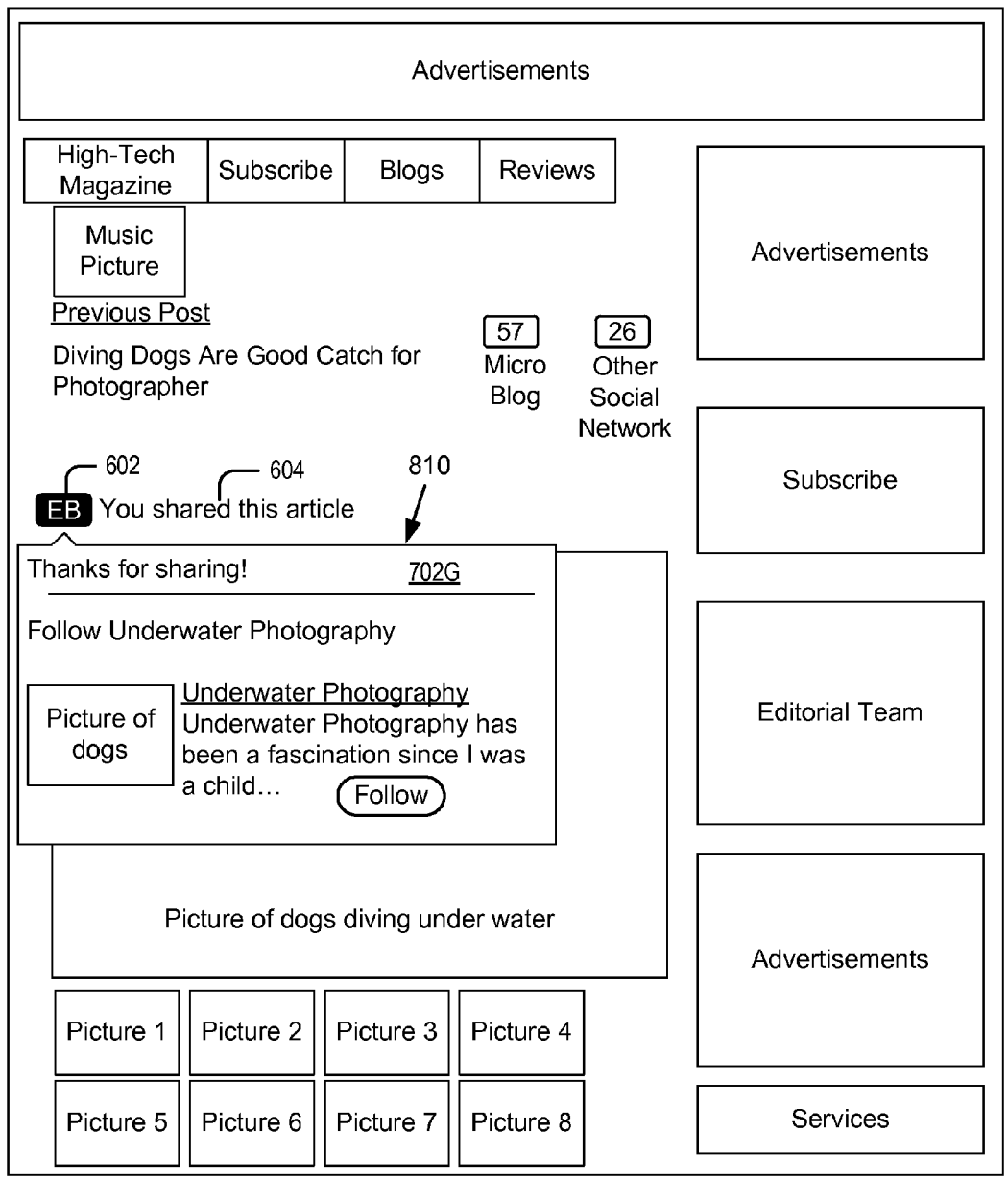

FIG. 13E shows an example implementation 1340 of the webpage 900 of FIG. 9 with the user interface 810 of FIG. 8B overlaid in response to user selection of the endorsement button 602.

Figure 13F:
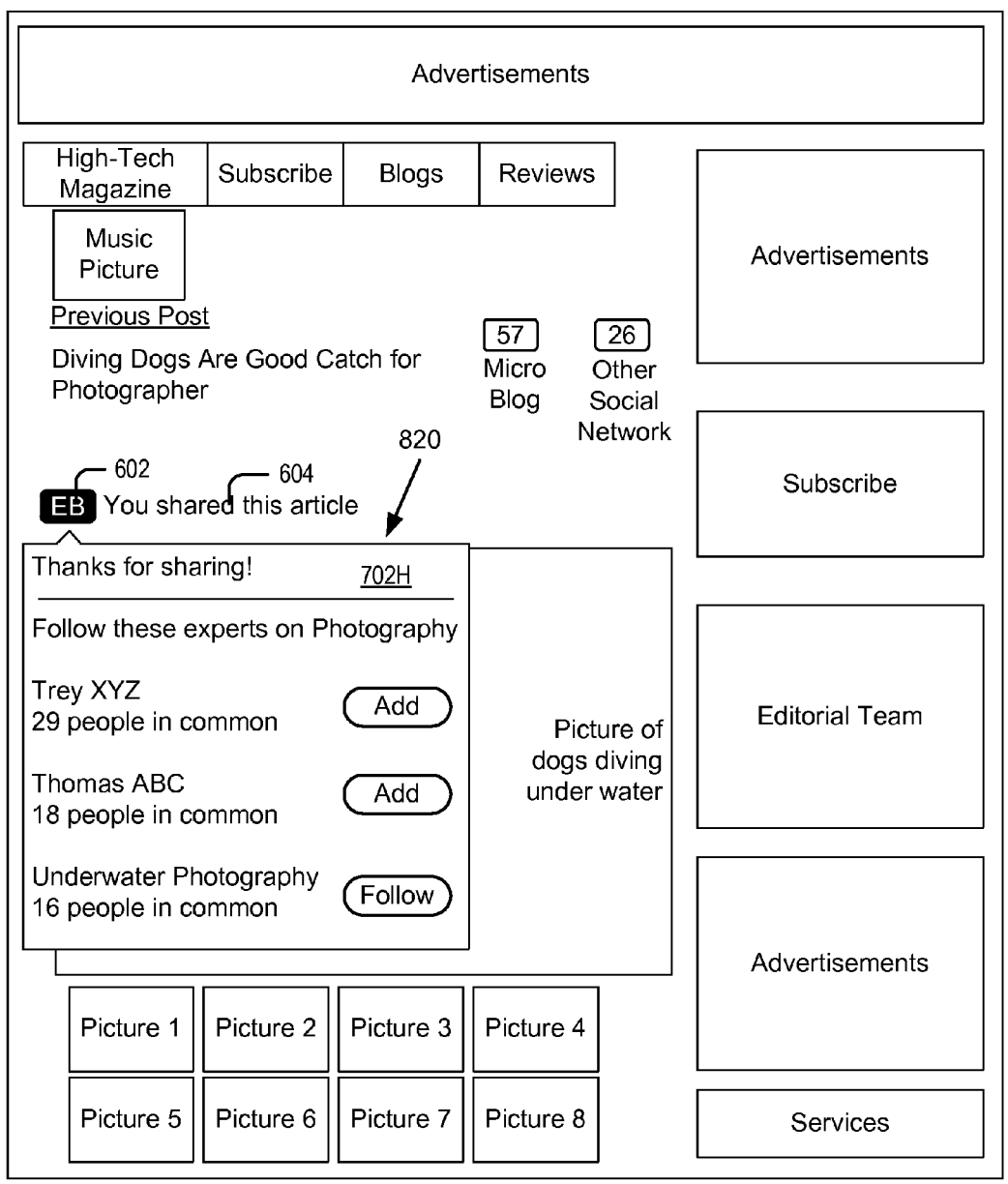

FIG. 13F shows an example implementation 1350 of the webpage 900 of FIG. 9 with the user interface 820 of FIG. 8C overlaid in response to user selection of the endorsement button 602.

A system for presenting a user interface with recommended content in response to an endorsement input has been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in one implementation below with reference to user interfaces and particular hardware. Moreover, the technologies disclosed above primarily in the context of a social network; however, the disclosed technologies apply to other data sources and other data types (e.g., collections of other resources including images, audio, web pages) that can be used to refine the search process.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In one implementation, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present disclosure can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
receiving an input from a first user;
determining that the input is related to an endorsement of a first content item from a first source;
determining that a social correlation exists between the first content item from the first source and a second content item from a second source by determining that a second user connected to the first user in a social graph performs a first type of engagement action on the first content item and a second type of engagement action on the second content item;
determining that a source correlation exists between the first source of the first content item and the second source of the second content item by determining that the first user performs an engagement action on both the first source of the first content and the second source of the second content item;
determining recommended content using the social correlation and the source correlation; and
generating graphical data for depicting a user interface element that provides the recommended content to the first user.

2. The method of claim 1, wherein the first source and the second source are associated with a domain specified by a publisher and the recommended content includes the second content item.

3. The method of claim 1, wherein the input is one of a request for an endorsement button to endorse the first content item, a cursor over the endorsement button, a selection of the endorsement button and a sharing of the first content item.

4. The method of claim 1, further comprising determining a user context describing the first user, and wherein the recommended content is further determined based on the user context.

5. The method of claim 4, wherein the user context describes one or more of a search history associated with the first user, social data associated with the first user, transaction data associated with the first user, advertisement data associated with the first user, whether the first user has made endorsements to other content items, whether a number of endorsements made by the first user is lower than a predetermined threshold, whether the first user has shared the first content item and whether the first user has commented on the first content item.

6. The method of claim 1, wherein the recommended content is ordered by one of a number of social annotations and recency of the recommended content.

7. The method of claim 1, wherein the user interface element is one of an endorsement button, an annotation and a share box.

8. A system comprising:
a processor, and;
a memory storing instructions that, when executed, cause the system to:
receive an input from a first user;
determine that the input is related to an endorsement of a first content item from a first source;
determine that a social correlation exists between the first content item from the first source and a second content item from a second source by determining that a second user connected to the first user in a social graph performs a first type of engagement action on the first content item and a second type of engagement action on the second content item;
determine that a source correlation exists between the first source of the first content item and the second source of the second content item by determining that the first user performs an engagement action on both the first source of the first content and the second source of the second content item;
determine recommended content using the social correlation and the source correlation; and
generate graphical data for depicting a user interface element that provides the recommended content to the first user.

9. The system of claim 8, wherein the first source and the second source are associated with a domain specified by a publisher and the recommended content includes the second content item.

10. The system of claim 8, wherein the input is one of a request for an endorsement button to endorse the first content item, a cursor over the endorsement button, a selection of the endorsement button and a sharing of the first content item.

11. The system of claim 8, wherein the instructions when executed cause the system to determine a user context describing the first user, and wherein the recommended content is further determined based on the user context.

12. The system of claim 11, wherein the user context describes one or more of a search history associated with the first user, social data associated with the first user, transaction data associated with the first user, advertisement data associated with the first user, whether the first user has made endorsements to other content items, whether a number of endorsements made by the first user is lower than a predetermined threshold, whether the first user has shared the first content item and whether the first user has commented on the first content item.

13. The system of claim 8, wherein the recommended content is ordered by one of a number of social annotations and recency of the recommended content.

14. The system of claim 8, wherein the user interface element is one of an endorsement button, an annotation and a share box.

15. A computer program product comprising a non-transitory computer usable medium including a computer readable program, wherein the computer readable program when executed on a computer causes the computer to:
receive an input from a first user;
determine that the input is related to an endorsement of a first content item from a first source;
determine that a social correlation exists between the first content item from the first source and a second content item from a second source by determining that a second user connected to the first user in a social graph performs a first type of engagement action on the first content item and a second type of engagement action on the second content item;
determine that a source correlation exists between the first source of the first content item and the second source of the second content item by determining that the first user performs an engagement action on both the first source of the first content and the second source of the second content item;
determine recommended content using the social correlation and the source correlation; and
generate graphical data for depicting a user interface element that provides the recommended content to the first user.

16. The computer program product of claim 15, wherein the first source and the second source are associated with a domain specified by a publisher and the recommended content includes the second content item.

17. The computer program product of claim 15, wherein the input is one of a request for an endorsement button to endorse the first content item, a cursor over the endorsement button, a selection of the endorsement button and a sharing of the first content item.

18. The computer program product of claim 15, wherein the computer readable program when executed on the computer further causes the computer to determine a user context describing the first user, and wherein the recommended content is further determined based on the user context.

19. The computer program product of claim 18, wherein the user context describes one or more of a search history associated with the first user, social data associated with the first user, transaction data associated with the first user, advertisement data associated with the first user, whether the first user has made endorsements to other content items, whether a number of endorsements made by the first user is lower than a predetermined threshold, whether the first user has shared the first content item and whether the first user has commented on the first content item.

20. The computer program product of claim 15, wherein the recommended content is ordered by one of a number of social annotations and recency of the recommended content.

* * * * *